(12) United States Patent
Kunishige et al.

(10) Patent No.: US 10,645,303 B2
(45) Date of Patent: May 5, 2020

(54) IMAGING DEVICE

(71) Applicant: Olympus Corporation, Hachioji-shi, Tokyo (JP)

(72) Inventors: Keiji Kunishige, Hachioji (JP); Masashi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/261,515

(22) Filed: Jan. 29, 2019

(65) Prior Publication Data

US 2019/0238738 A1 Aug. 1, 2019

(30) Foreign Application Priority Data

Jan. 30, 2018 (JP) .................... 2018-013633

(51) Int. Cl.
*H04N 5/235* (2006.01)
*H04N 5/232* (2006.01)

(52) U.S. Cl.
CPC ....... *H04N 5/2353* (2013.01); *H04N 5/23245* (2013.01); *H04N 5/23293* (2013.01); *H04N 5/23296* (2013.01)

(58) Field of Classification Search
CPC ............. H04N 5/2353; H04N 5/23293; H04N 5/23296; H04N 5/23245
See application file for complete search history.

(56) References Cited

U.S. PATENT DOCUMENTS

2016/0381281 A1* 12/2016 Ueguri ............... H04N 5/23212
348/333.02

FOREIGN PATENT DOCUMENTS

JP 2004-193922 7/2004

* cited by examiner

*Primary Examiner* — Christopher K Peterson
(74) *Attorney, Agent, or Firm* — John C. Pokotylo; Pokotylo Patent Services

(57) ABSTRACT

An imaging device includes an imaging unit, a controller, and a display. The controller changes a shutter speed series to any one of a first shutter speed series and a second shutter speed series. The controller controls an exposure time of the imaging unit according to the first shutter speed series or the second shutter speed series. The controller changes a live view display mode to any of a first live view display mode and a second live view display mode. The first live view display mode has at least an enlarged live view display mode and a normal magnification live view mode. The enlarged live view display mode is a mode in which a part of the digital image is cut out to be displayed at an enlargement magnification substantially equal to or more than a pixel equal magnification.

11 Claims, 29 Drawing Sheets

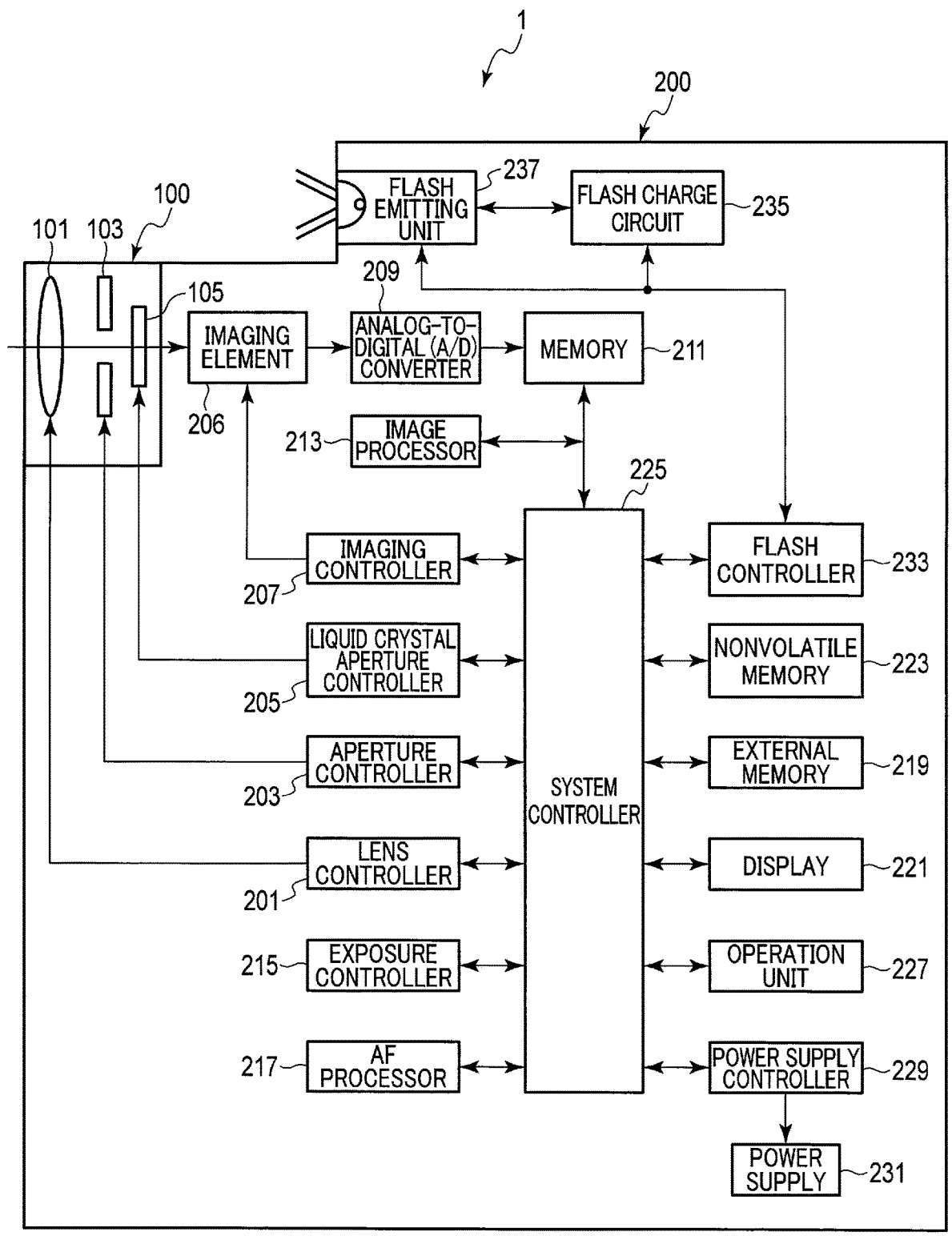
F I G. 1

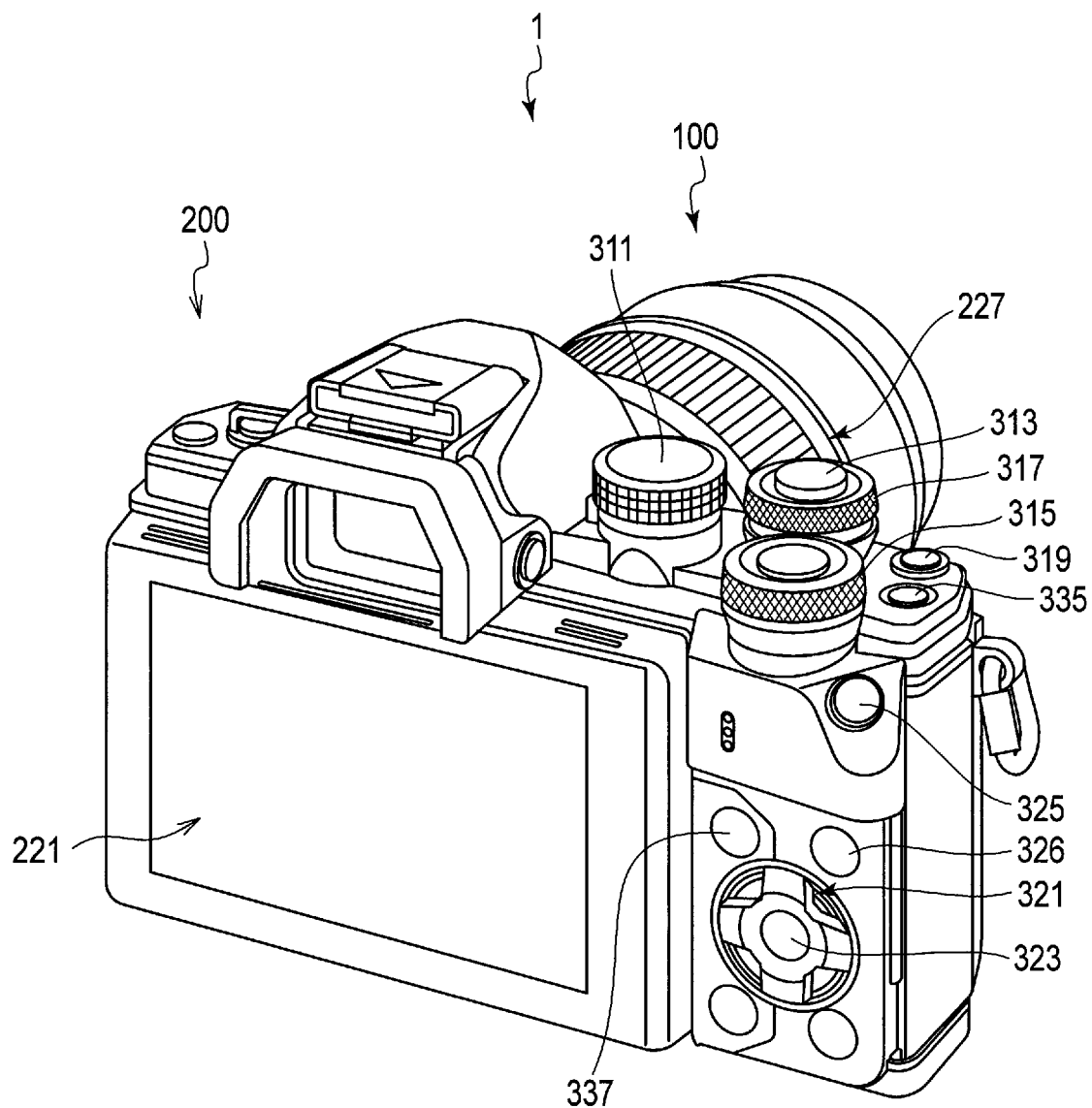
F I G. 2

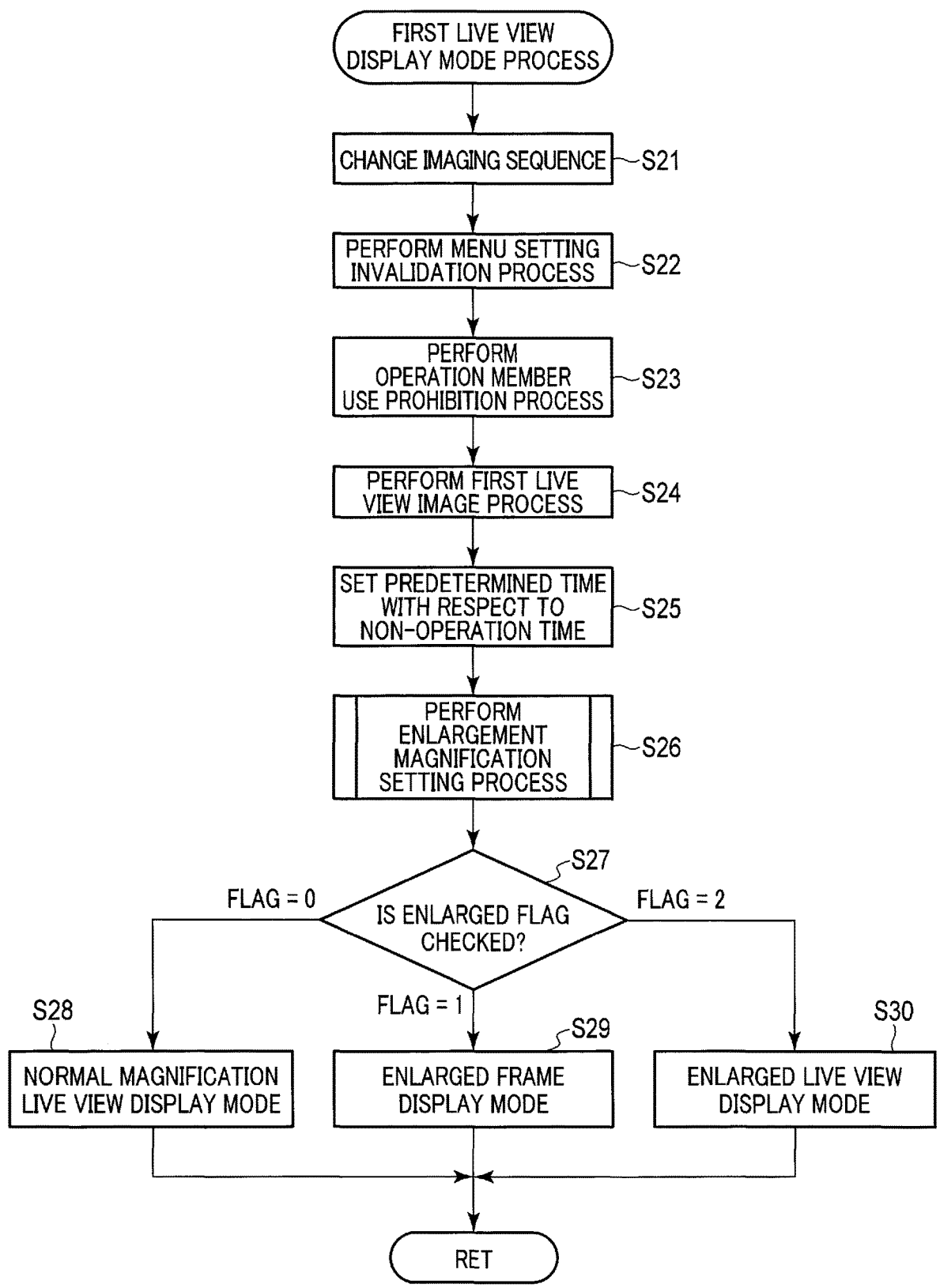
F I G. 4B

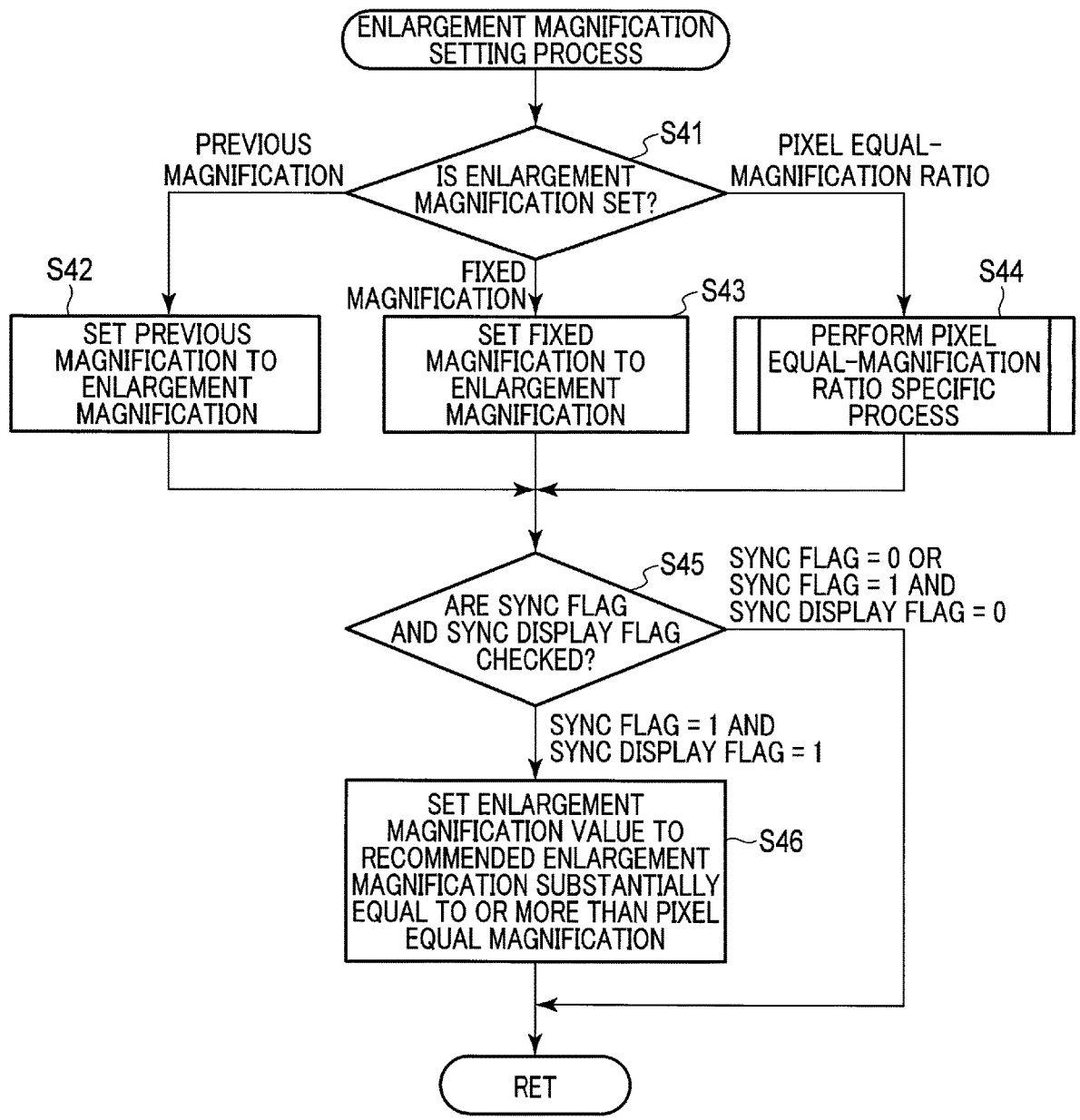
F I G. 4D

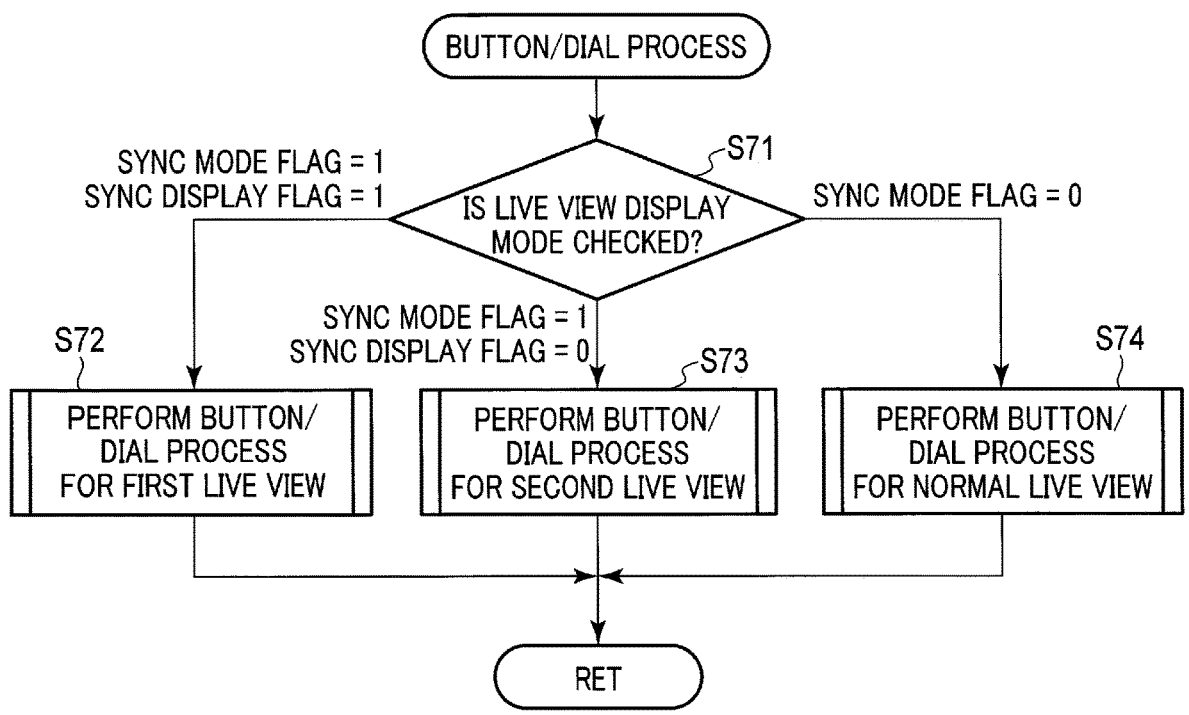
F I G. 4H

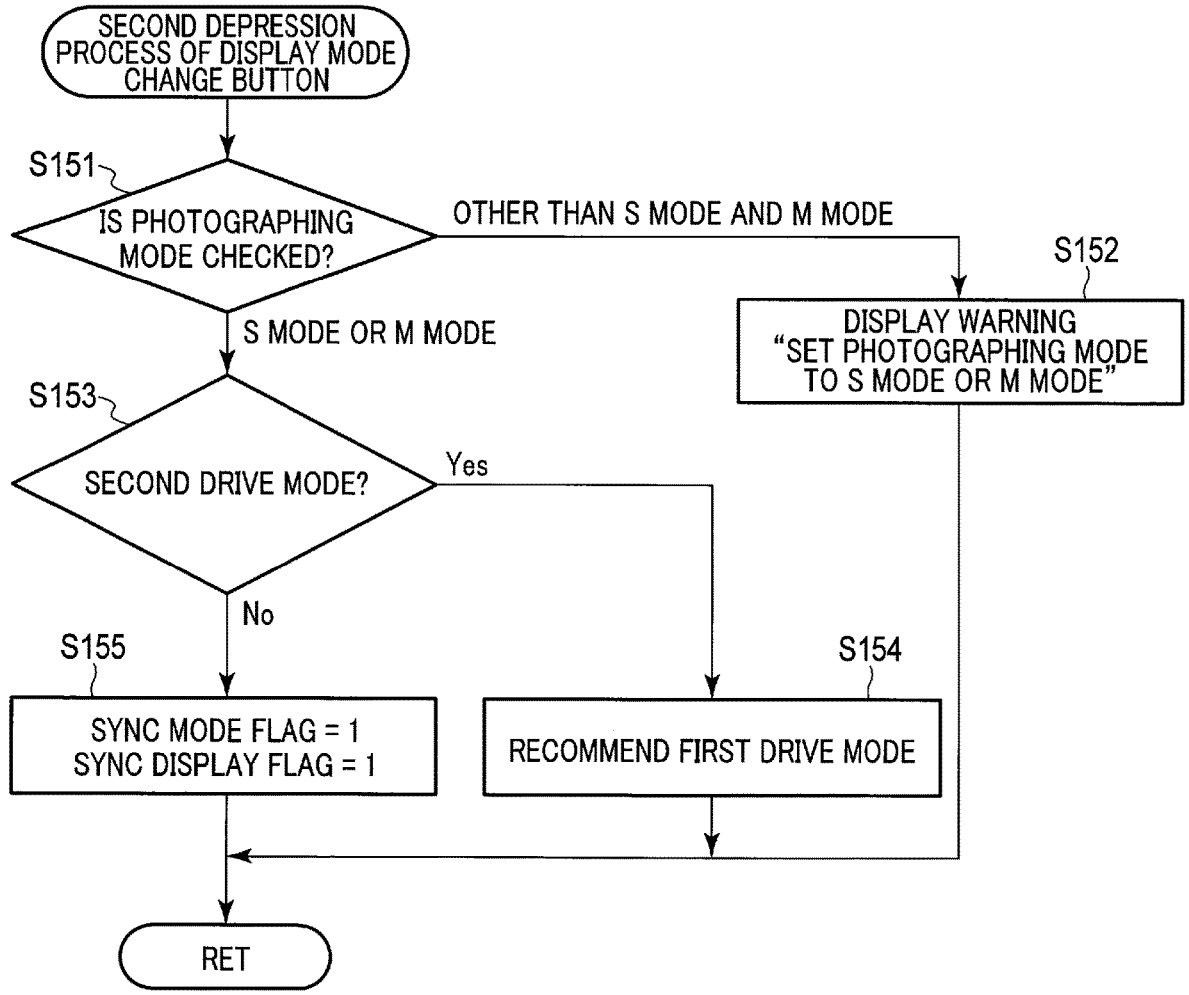
F I G. 4N

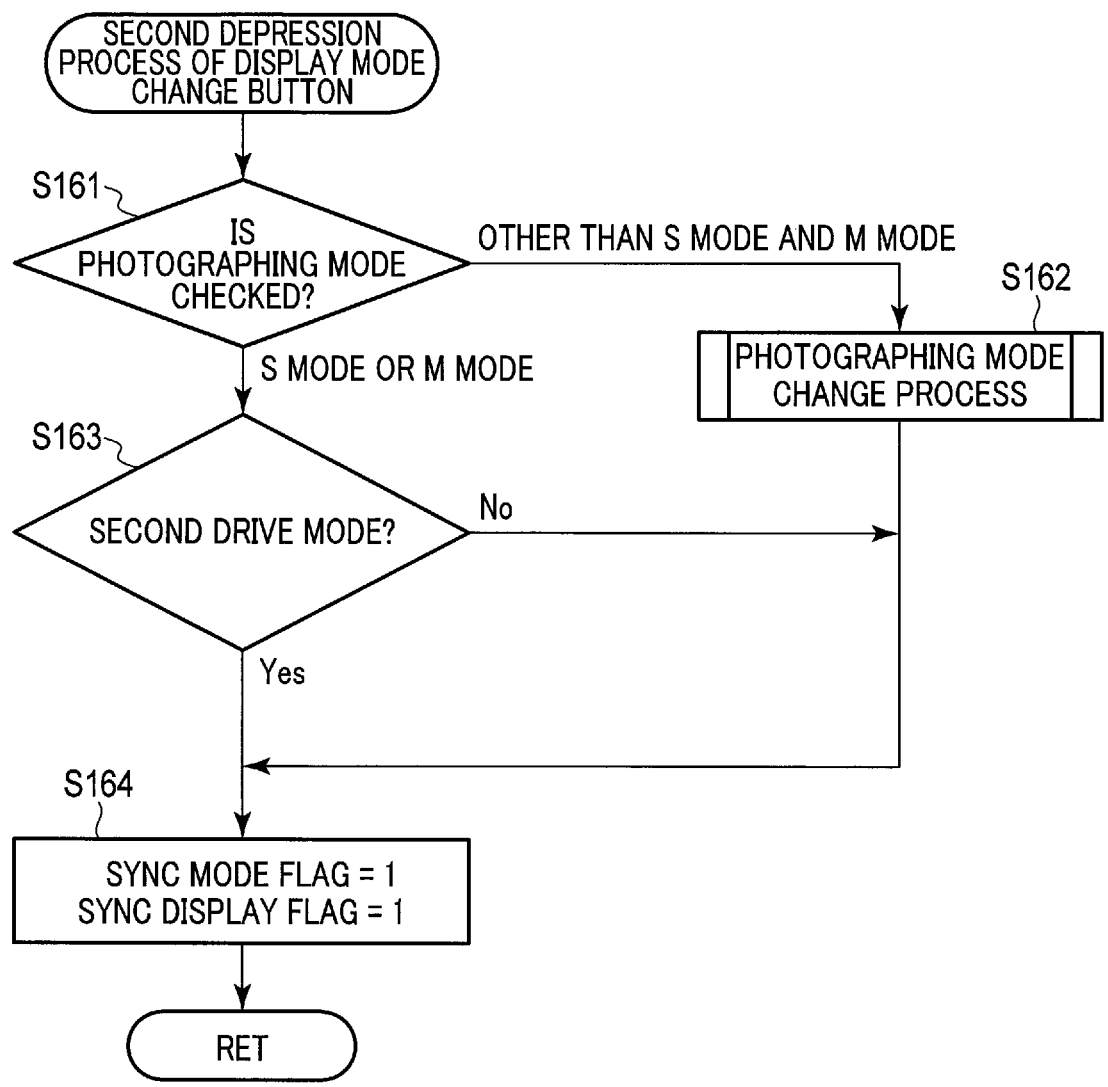
F I G. 4Q

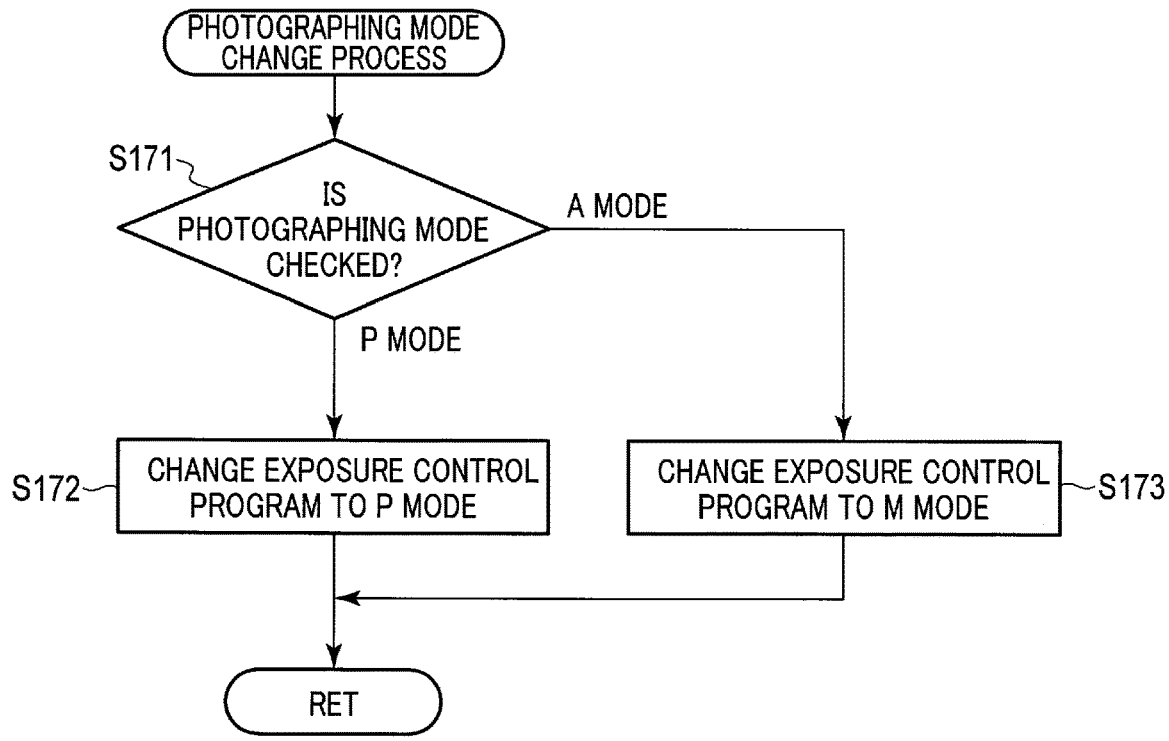
F I G. 4R
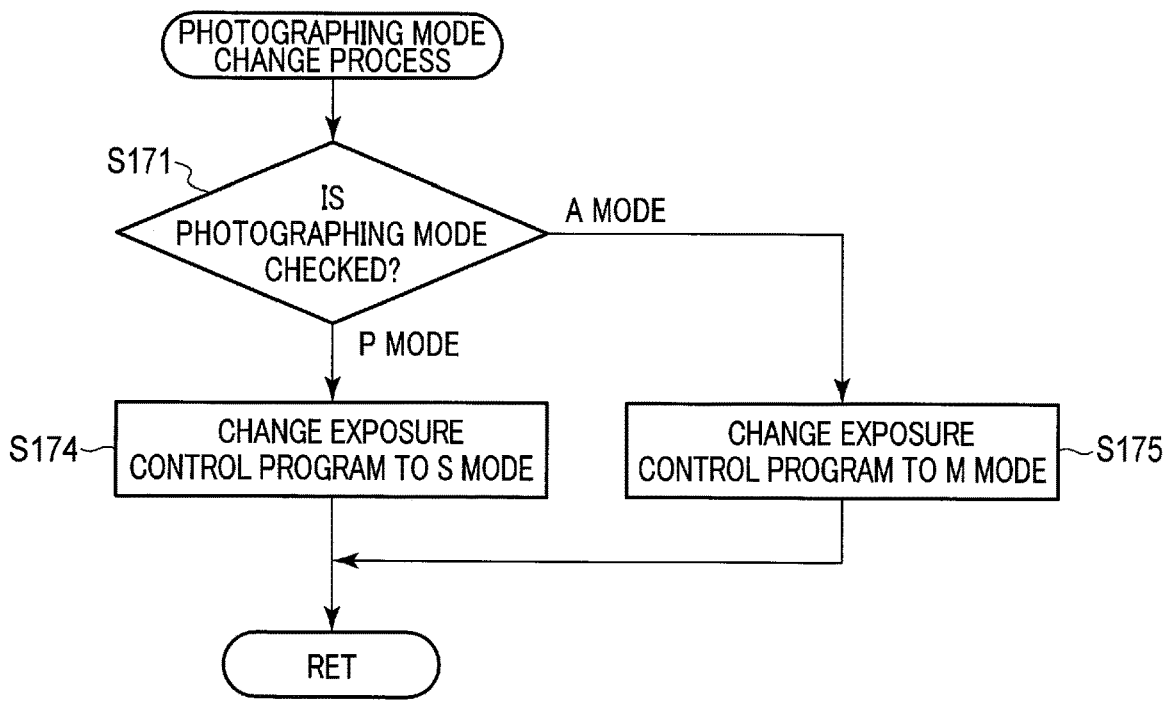
F I G. 4S

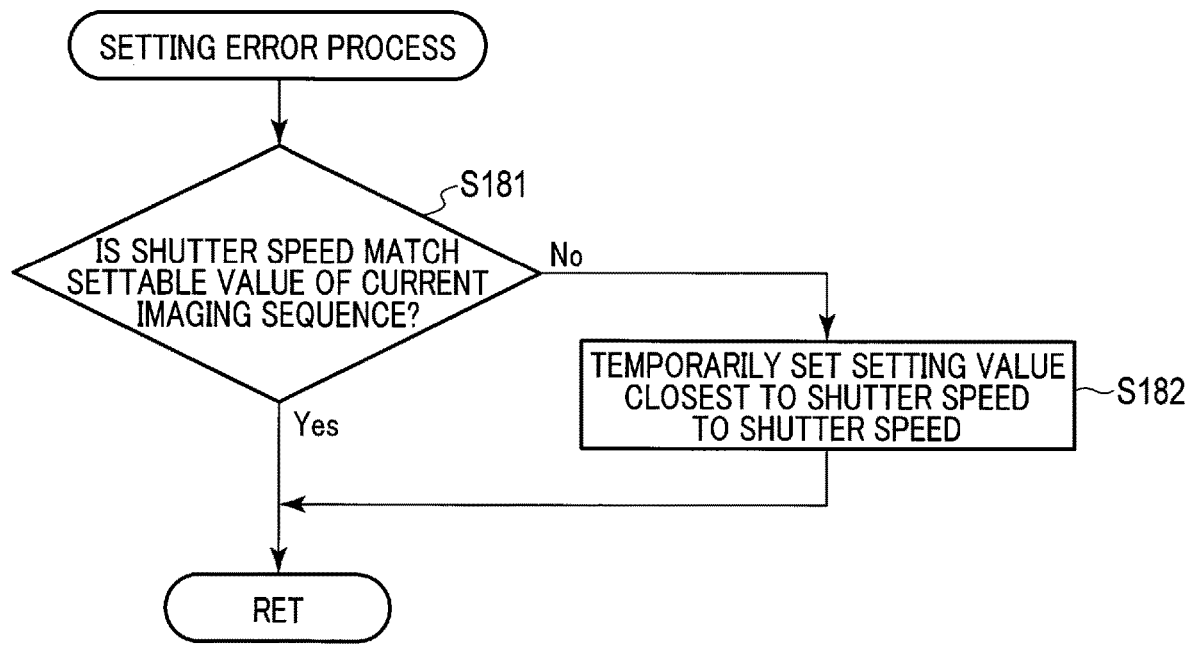
F I G. 8

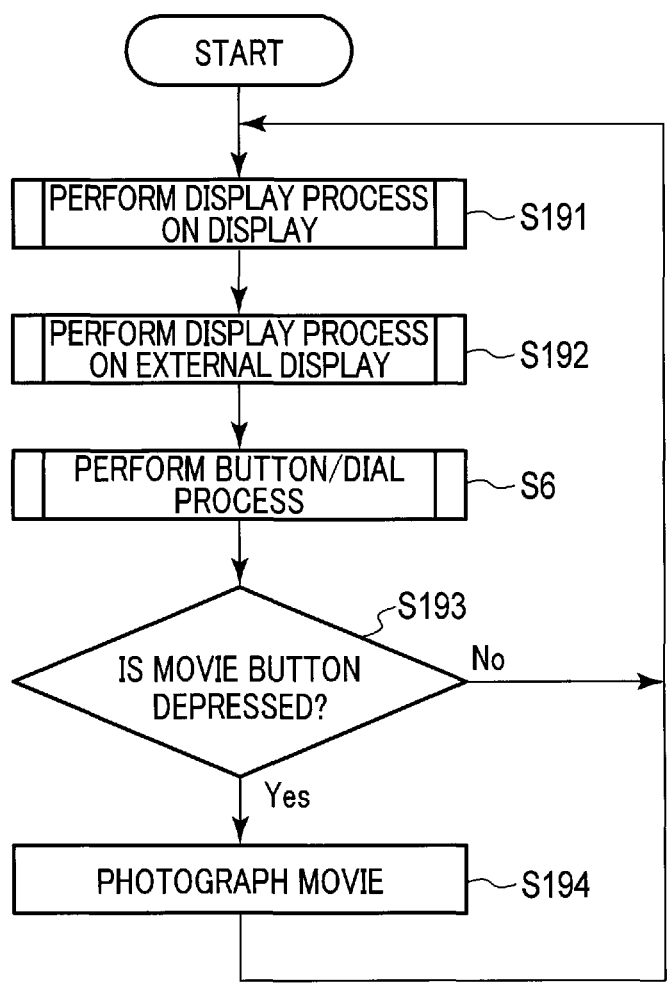
F I G. 10A

IMAGING DEVICE

CROSS-REFERENCE TO RELATED APPLICATIONS

This application is based upon and claims the benefit of priority from the prior Japanese Patent Applications No. 2018-013633, filed Jan. 30, 2018, the entire contents of which are incorporated herein by reference.

FIELD

Exemplary embodiment relates to an imaging device.

BACKGROUND

A fluorescent lamp flickers at 100 Hz (power supply frequency of 50 Hz) or 120 Hz (power supply frequency of 60 Hz). It has been known that lateral stripes due to flicker may occur in a photographed image when photographing is performed under a flicker light source repeating the flicking. Examples of a method for suppressing an influence of the lateral stripes due to the flicker may include Jpn. Pat. Appln. KOKAI Publication No. 2004-193922. A camera device disclosed in Jpn. Pat. Appln. KOKAI Publication No. 2004-193922 detects a flicker cycle of the fluorescent lamp and performs photographing at a high-speed shutter speed in the vicinity of a peak, at which brightness is relatively stable, in synchronization with the flicker cycle, thereby reducing the influence of the flickering.

SUMMARY

According to an embodiment, there is provided an imaging device, comprising: an imaging unit configured to sequentially output a digital image by capturing a subject; a controller configured to: change a shutter speed series, which is a series of a value of a shutter speed set for the imaging unit, to any one of a first shutter speed series and a second shutter speed series, the second shutter speed series having a value of a shutter speed having a finer step than the first shutter speed series, control an exposure time of the imaging unit according to the first shutter speed series or the second shutter speed series, and change a live view display mode to any of a first live view display mode and a second live view display mode, the first live view display mode being a mode sequentially displaying the digital image output according to a still image imaging sequence reading all pixels of an image captured with a value of a shutter speed of the second shutter speed series and the second live view display mode being a mode sequentially displaying the digital image output according to an imaging sequence performing addition or thinning-out reading of pixels of the captured image; and a display configured to display the digital image in the changed live view display mode, wherein the first live view display mode has at least an enlarged live view display mode and a normal magnification live view mode, the enlarged live view display mode is a mode in which a part of the digital image is cut out to be displayed at an enlargement magnification substantially equal to or more than a pixel equal magnification, and the normal live view display mode is a mode in which a display is performed at a lower magnification than the enlargement magnification.

According to an embodiment, there is provided an imaging device, comprising: an imaging unit configured to sequentially output a digital image by capturing a subject; a controller configured to: change a shutter speed series, which is a series of a value of a shutter speed set for the imaging unit, to any of a first shutter speed series and a second shutter speed series, the second shutter speed series having a value of a shutter speed having a finer step than the first shutter speed series, control an exposure time of the imaging unit according to the first shutter speed series or the second shutter speed series, and change a live view display mode to either a first live view display mode or a second live view display mode, the first live view display mode being a mode sequentially displaying the digital image output according to a still image imaging sequence reading all pixels of an image captured with a value of a shutter speed of the second shutter speed series or a movie imaging sequence, and the second live view display mode being a mode sequentially displaying the digital image output according to an imaging sequence performing addition or thinning-out reading of pixels of the captured image in the case of the still image photographing mode or a mode sequentially displaying the movie captured at the value of the shutter speed of the second shutter speed series in the case of the movie photographing mode; and a display configured to display the digital image or the movie in the changed live view display mode and to simultaneously display a plurality of shutter speeds, wherein the controller changes a shutter speed to one shutter speed from the shutter speeds simultaneously displayed on the display, and the first live view display mode has at least an enlarged live view display mode and a normal magnification live view mode, the enlarged live view display mode is a mode in which a part of the digital image is cut out to be displayed at an enlargement magnification substantially equal to or more than a pixel equal magnification, and the normal live view display mode is a mode in which a display is performed at a lower magnification than the enlargement magnification.

According to an embodiment, there is provided an imaging device, comprising: an imaging unit configured to sequentially output a movie by capturing a subject; a display configured to display the movie; and a controller configured to: change a shutter speed series, which is a series of a value of a shutter speed set for the imaging unit, to any of a first shutter speed series and a second shutter speed series, the second shutter speed series having a value of a shutter speed having a finer step than the first shutter speed series, control an exposure time of the imaging unit according to the first shutter speed series or the second shutter speed series, change a live view display mode to a first live view display mode or a second live view display mode, the first live view display mode being a mode which sequentially displays the movie output according to a movie imaging sequence reading all pixels of an image captured with a value of a shutter speed of the second shutter speed series and the second live view display mode being a mode which is captured in the movie imaging sequence and sequentially displays a movie subjected to image process set in a movie picture mode, set an output mode of a live view to any of a monitor mode and a recording mode, and output the same movie as the displayed movie to the outside according to the changed live view display mode when the monitor mode is set, output the movie displayed according to the first live view display mode or the movie displayed according to the second live view display mode to the display when the recording mode is set, and output the movie displayed according to the second live view display mode of an equal-magnification display without information display to the outside.

Advantages of the embodiment will be set forth in the description which follows, and in part will be obvious from the description. The advantages of the embodiment may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 1 is a block diagram showing a configuration of a camera system as an example of an imaging device according to a first embodiment;

FIG. 2 is a diagram showing an appearance configuration of the camera system;

FIG. 4B is a flowchart showing the operation of the camera system for first live view display mode process;

FIG. 4D is a flowchart showing the operation of the camera system for enlargement magnification setting process;

FIG. 4H is a flowchart showing the operation of the camera system for button/dial process;

FIG. 4I is a flowchart showing the operation of the camera system for a button/dial process for the first live view display mode;

FIG. 4N is a flowchart showing the operation of the camera system for second depression process of the display mode change button;

FIG. 4O is a flowchart showing the operation of the camera system for a first modification of the second depression process;

FIG. 4Q is a flowchart showing the operation of the camera system for a second modification of the second depression process;

FIG. 4R is a flowchart showing the operation of the camera system for photographing mode change process;

FIG. 4S is a flowchart showing the operation of the camera system for the first modification of the photographing mode change process;

FIG. 8 is a diagram showing a third embodiment, and a flowchart showing an operation of a camera system for setting error process;

FIG. 10A is a flowchart showing operations of the camera system and the external device in movie photographing;

DETAILED DESCRIPTION

Figure 3:
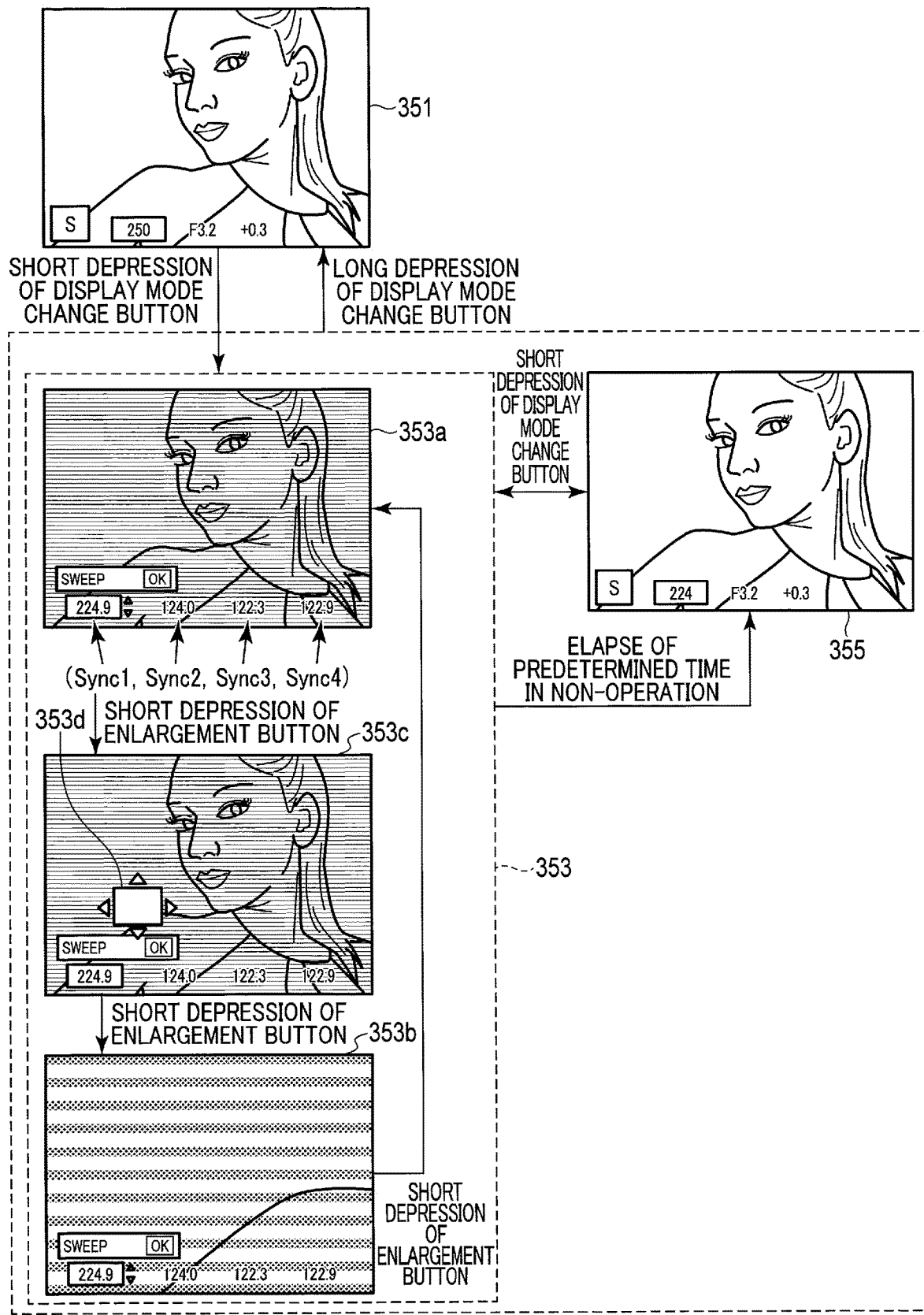
FIG. 3 is a diagram for describing each live view image displayed on a display of the camera system.

Hereinafter, each embodiment will be described with reference to the drawings. For clarity of illustration, some of members will be omitted in some drawings.

First Embodiment

A first embodiment will be described with reference to FIGS. 1 and 2. FIG. 1 is a block diagram showing a configuration of a camera system 1 as an example of an imaging device according to a first embodiment. FIG. 2 is a diagram showing an appearance configuration of the camera system 1.

As shown in FIGS. 1 and 2, the camera system 1 is a lens integrated type camera system in which a lens 100 and a camera body 200 are integrally formed. The camera system 1 may not be necessarily a lens integrated type camera system. For example, the camera system 1 may be a lens interchangeable camera system in which an interchangeable lens is configured to be detached from a camera body 200.

As shown in FIG. 1, a lens 100 has an imaging lens 101, an aperture 103, and a liquid crystal aperture 105.

The imaging lens 101 is an optical system for forming a luminous flux from a subject on an imaging element 206 of the camera body 200 to be described later. The imaging lens 101 is a single lens or a plurality of lenses which include a focus lens. Here, the imaging lens 101 may be constituted by a zoom lens. The aperture 103 is disposed on an optical axis of the imaging lens 101, and a caliber of the aperture is configured to be mechanically variable. The aperture 103 regulates the amount of luminous flux from a subject which passes through the imaging lens 101 and is incident on the imaging element 206. The liquid crystal aperture 105 is disposed on the optical axis of the imaging lens 101, and is disposed between the aperture 103 and the imaging element 206. The liquid crystal aperture 105 is configured to electrically limit a transmission of light by a voltage applied to a liquid crystal. The liquid crystal aperture 105 regulates the amount of luminous flux from a subject which passes through the aperture 103 and is incident on the imaging element 206.

The camera body 200 includes a lens controller 201, an aperture controller 203, a liquid crystal aperture controller 205, the imaging element 206, an imaging controller 207, an analog-to-digital (A/D) converter 209, a memory 211, an image processor 213, an exposure controller 215, an AF processor 217, an external memory 219, a display 221, a nonvolatile memory 223, a system controller 225, an operation unit 227, a power supply controller 229, a power supply 231, a flash controller 233, a flash charge circuit 235, and a flash emitting unit 237. Here, each block of the camera body 200 is constituted by hardware, for example. However, each block may not be necessarily constituted by hardware, or may be constituted by software. In addition, each block of the camera body 200 may not be constituted by single hardware or software, or may be constituted by a plurality of hardware or software.

The lens controller 201 drives the focus lens or the zoom lens of the imaging lens 101 based on the control signal from the system controller 225. The aperture controller 203 controls the caliber of the aperture 103 based on the control signal from the system controller 225. The liquid crystal aperture controller 205 controls a voltage applied to the liquid crystal aperture 105 based on the control signal from the system controller 225.

The imaging element 206 as an imaging unit is disposed on the optical axis of the imaging lens 101 and is disposed behind the liquid crystal aperture 105 and at a position where the luminous flux from a subject is formed by the imaging lens 101. The imaging element 206 has pixels arranged two-dimensionally or three-dimensionally. Each pixel generates charges depending on a light receiving amount. In addition, a color filter is formed in each pixel. Such an imaging element 206 captures a subject (subject field) to generate an image signal. Here, the imaging element 206 may have focus detection pixels. The imaging controller 207 drives the imaging element 206. In addition, the imaging controller 207 controls reading of an image signal generated by the imaging element 206.

The A/D converter 209 converts the image signal output from the imaging element 206 into image data in a digital format.

The memory 211 is, for example, an SDRAM which is electrically rewritable, and temporarily stores various data such as the image data output from the A/D converter 209 or the image processor 213 and process data in the AF processor 217 or the system controller 225. A DRAM may be used for temporary storage.

The image processor 213 performs various image processes on image data. The image processor 213 may be constituted by hardware, software, or a combination of hardware and software. The image processor 213 performs the basic image process necessary for displaying or recording an image on the image data. This basic image process includes, for example, white balance (WB) correction process, color reproduction process, gradation correction process, edge emphasizing process, and noise reduction process. The image processor 213 performs special image process for imparting a special visual effect to the image data. The special image process includes, for example, trimming process and contrast emphasizing process. These special image processes are, for example, used for highlighting lateral stripes in a first live view display mode described later.

The exposure controller 215 performs automatic exposure (AF) process. Specifically, the exposure controller 215 controls photographing conditions (for example, an enlargement magnification, an aperture value, and a value of a shutter speed) based on brightness of a subject acquired from the image data or the like or based on the setting of the operation unit 227.

The AF processor 217 performs automatic focus adjustment (AF) process. Specifically, the AF processor 217 controls the driving of the focus lens included in the imaging lens 101 based on focus information acquired from the image data or the like. The focus information may be, for example, an AF evaluation value (contrast value) calculated from the image data, or may be a defocus amount calculated from an output of a focus detection pixel or the like.

The external memory 219 is a storage medium such as a flash memory, and is configured to be loaded in the camera body 200. The external memory 219 stores the image data processed by the image processor 213 as an image file in a predetermined format.

The display 221 is, for example, a display such as a liquid crystal display or an organic EL display, and is disposed on, for example, a back surface (see FIG. 2) of the camera body 200. The display 221 is driven by the system controller 225, and displays various images such as a still image or a movie. Here, the display 221 is not necessarily provided in the camera body 200. The display 221 may be, for example, a TV monitor or the like which is communicatively connected to the camera body 200. The display 221 may have a function of a touch panel or the like which performs the same functions as operations of operation members such as various kinds of buttons and dials of the operation unit 227.

The nonvolatile memory 223 is a storage medium such as the flash memory, and is configured to be embedded in the camera body 200. The nonvolatile memory 223 stores programs necessary for the operation of the camera body 200. In addition, the nonvolatile memory 223 stores information necessary for various processes of the camera body 200. This information includes information of parameters of image process, for example.

The system controller 225 is, for example, a microcomputer, and controls each block of the camera body 200 according to the programs stored in the nonvolatile memory 223. The system controller 225 is not necessarily constituted by the microcomputer, and may be constituted by a CPU, an ASIC, an FPGA, or the like.

The power supply controller 229 controls the supply of power from the power supply 231 according to a turn on state or a turn off state of a power supply button (not shown) which is disposed on the operation unit 227 of the camera body 200. When the power supply button is in the turn on state, the power supply 231 supplies power to each block of the camera body 200. When the power supply button is in the turn off state, the power supply 231 stops supplying power to each block. The power supply 231 may be, for example, a primary battery or a secondary battery, or may be one supplied with power from an external power supply (not shown).

The flash controller 233 controls driving or stopping of each of the flash charge circuit 235 and the flash emitting unit 237. The flash charge circuit 235 includes a charge circuit for charging power necessary for flash emission by the flash emitting unit 237. The flash emitting unit 237 has, for example, an LED light source and a reflecting umbrella. The flash emitting unit 237 emits illumination light in response to an instruction of flash emission from the flash controller 233.

As shown in FIG. 2, the operation unit 227 includes a photographing mode dial 311, a release button (shutter button) 313, an R-dial 315, an F-dial 317, an enlargement button 319, an arrow button 321 which is a menu button, an OK button 323 which is a decision button, a display mode change button 325, a drive button 326, a movie button 335, and a teleconverter button 337. The operation unit 227 detects operation states of operation members such as various buttons and dials, and outputs a signal indicating the detected result to the system controller 225.

The photographing mode dial 311 is a dial for selecting a photographing mode of the camera system 1. The photographing mode includes, for example, a program photographing mode (hereinafter, referred to as a P mode), an aperture priority photographing mode (hereinafter, referred to as an A mode), a shutter priority photographing mode (hereinafter, referred to as an S mode), a manual photographing mode (hereinafter, referred to as an M mode).

The release button 313 is a button for instructing the system controller 225 to photograph a still image. The release button 313 is a two-step type push button. A state in which the release button 313 is shallowly depressed up to a first stage is referred to as a half depression, and a state in which the release button 313 is deeply depressed up to a second stage is referred to as a full depression. A subject is focused by the half depression, and a still image is captured by the full depression. The movie button 335 is a button for instructing the system controller 225 to photograph a movie. The teleconverter button 337 is a button for instructing the system controller 225 to enlarge a part of an image.

The R-dial 315 and the F-dial 317 are dials which change the function assigned by the operation state of the camera body 200. For example, during the photographing of the still image, the R-dial 315 functions as the dial for instructing the system controller 225 to change the shutter speed of the imaging element 206. In addition, for example, during the photographing of the still image, the F-dial 317 functions as the dial for instructing the system controller 225 to change the enlargement magnification of the imaging element 206.

The enlargement button 319 is a button for instructing the system controller 225 to enlarge a part of the image displayed on the display 221.

The drive button 326 is a button for instructing the system controller 225 to display a drive mode of the imaging element 206. When the drive button 326 is depressed, a menu screen for displaying the drive mode is displayed on the display 221. The drive mode corresponds to an imaging sequence, and includes, for example, single photographing mode, a continuous photographing mode, or the like. In addition, the drive mode is associated with the shutter. That is, when the drive mode is determined, the shutter to be used is determined. The shutter includes, for example, a mechanical shutter, an electronic front curtain shutter, an electronic rolling shutter, or the like. The drive mode and the shutter mode may be set individually.

The arrow button 321 is a button for instructing the change and setting of various setting values of the camera body 200 and the change and setting of various modes. The arrow button 321 is also a button for changing a shutter speed series of the imaging element 206 to any of a first shutter speed series and a second shutter speed series smaller than the first shutter speed series. Here, the shutter speed series is a series of values of the shutter speed which can be set for the imaging element 206. The system controller 225 controls an exposure time of the imaging unit in accordance with the first shutter speed series or the second shutter speed series which is switched by the arrow button 321. The values of the shutter speed included in each of the first shutter speed series and the second shutter speed series is stored in the nonvolatile memory 223.

The OK button 323 is a button for determining the change and setting of various setting values. The OK button 323 is also a button for determining the change and setting of various modes.

The display mode change button 325 is a button for changing the live view display mode of the camera body 200 to any of the normal live view display mode based on the first shutter speed series and the live view display mode based on the second shutter speed series. The live view display mode based on the second shutter series has the second live view display mode in addition to the first live view display mode. The display mode change button 325 is also a button for changing the live view display mode of the camera body 200 to any of the first live view display mode and the second live view display mode under the live view display mode based on the second shutter speed series. The display 221 displays a digital image in the live view display mode which is changed by the display mode change button 325.

Next, the normal live view display mode and the first and second live view display modes will be described.

The normal live view display mode is a live view display mode, which allows a user to perform framing, in order to perform the photographing based on the first shutter speed series. In the normal live view display mode, the image subjected to the basic image process based on the white balance and a picture mode which are designated by the user is displayed on the display 221. The image displayed in the normal live view display mode is referred to as a normal live view image 351 (see FIG. 3).

The first and second live view display modes are the live view display mode for performing the photographing based on the second shutter speed series in order to suppress the occurrence of the lateral stripes which can occur under the flicker light source which repeats the flickering.

In the first live view display mode, the imaging element 206 is driven by the still image imaging sequence (the frame rate, the exposure time, and the like). In the first live view display mode, an image generated from a high-definition image of all pixels obtained in the still image imaging sequence is live-view-displayed. In the second live view display mode, a reading speed is increased by addition of pixels, thinning-out reading of pixels or the like, and the imaging element 206 is driven by the imaging sequence which prioritizes followability and visibility of the subject. This imaging sequence is different from the still image imaging sequence.

The first live view display mode is a display mode which selects and sets the shutter speed at which the lateral stripes do not occur from the second shutter speed series while the user confirms the live view. Here, for example, four shutter speed values are stored, and the user can select one value from the four values by using left and right buttons of the arrow button 321. In addition, the user can change the value itself of the selected value by using up/down buttons of the arrow button 321 while visually observing the live view. In the actual photographing, the selected value may be four or more, or may be one. The first live view display mode has a live view display mode using a low enlargement magnification for visually recognizing coarse lateral stripes or flowing lateral stripes and a live view display mode using a high enlargement magnification being aware of a pixel equal magnification for visually recognizing lateral stripes in one pixel line unit which cannot be confirmed at the low enlargement magnification. Since the coarse lateral stripes cannot be visually recognized at the high enlargement magnification, the shutter speed needs to be set in the state in which live views having two or more enlargement magnifications such as high and low enlargement magnifications are displayed. It is important to simultaneously confirm the setting of the shutter speed and the visual recognition of the lateral stripes by simply changing the setting, or the like. In the first live view display mode, the special image process may be performed out so that the lateral stripes are further emphasized to be easily recognized visually. There is also an additional effect that the first live view display mode state is easily understood by performing image process such as monochromatization.

The second live view display mode is a mode which sequentially displays images captured in the imaging sequence performing the addition of pixels or the thinning out reading of pixels on the display 221, and is a mode which performs the photographing in the second shutter speed series. In the second live view display mode, the followability and visibility of a moving subject is prioritized over the visibility of the lateral stripes, and the imaging element 206 is driven in the imaging sequence in which a refresh time is shortened at a high frame rate and a short display latency rather than the still image imaging sequence. In the second live view display mode, when the display 221 displays a 1-time full image, the addition of pixels or the thinning out of pixels is performed according to the number of pixels of the display device. By the adding or thinning out of pixels, the high-speed capability of the photographing is ensured.

In the first and second live view display modes, the shutter speed of the shutter speed series which is smaller than the shutter speed of the shutter speed series of the normal live view display mode can be selected by the arrow button 321. The shutter speed series in the normal live view display mode has, for example, values of the shutter speed such as 1 step, ½ steps, and ⅓ steps. On the other hand, the shutter speed series in the first and second live view display modes has values of a shutter speed having a finer step than the normal live view display mode, for example, values of a shutter speed such as 1/50 steps to 1/500 steps.

The image displayed in the first live view display mode is referred to as a first live view image 353 (see FIG. 3), and the image displayed in the second live view display mode is referred to as a second live view image 355 (see FIG. 3).

As shown in FIG. 3, in the normal live view display mode, when the display mode change button 325 is depressed for a short time (hereinafter, referred to as a short depression), the system controller 225 performs changing from the normal live view display mode to the first live view display mode. As a result, the image to be displayed is changed from the normal live view image 351 to the first live view image 353. In addition, in the first and second live view display modes, when the display mode change button 325 is depressed for a long time (hereinafter, referred to as a long depression), the system controller 225 is changed from the first and second live display modes to the normal live view display mode. As a result, the image to be displayed is changed from the first live view image 353 or the second live view image 355 to the normal live view image 351.

In the first live view display mode, when the display mode change button 325 is depressed for a short time, the system controller 225 changes the first live view display mode to the second live view display mode. As a result, the image to be displayed is changed from the first live view image 353 to the second live view image 355. In the second live view display mode, when the display mode change button 325 is depressed for a short time, the system controller 225 changes the second live view display mode to the first live view display mode. As a result, the image to be displayed is changed from the second live view image 355 to the first live view image 353.

In addition, in the first live view display mode, even when a non-operation time for which the operation member is not operated in which the operation member such as the display mode change button 325 or the enlargement button 319 is not depressed passes a predetermined time such as one minute to several minutes, the system controller 225 changes the first live view display mode to the second live view display mode. As a result, the image to be displayed is changed from the second live view image 355 to the first live view image 353. In the first live view display mode, the live view is displayed based on a high-definition image of all pixels obtained in the still image imaging sequence. As a result, in the first live view display mode, the temperature of the imaging element 206 tends to rise. When the temperature of the imaging element 206 rises, an S/N ratio of the image signal output from the imaging element 206 deteriorates. Therefore, it is difficult to perform the ideal low-noise photographing. In addition, when the temperature further rises, the operation of the imaging element 206 stops in some cases. Then, it is necessary to cool the imaging element 206 until the imaging element 206 can be operated again, such that the photographing cannot be made only if the photographing should wait for, for example, several tens of minutes until the imaging element 206 is cooled down and the photographing opportunity can be inadvertently lost. Therefore, it is preferable that the live view display by the first live view mode is not unnecessarily long. Therefore, when the non-operation time in the first live view display mode passes a predetermined time, the system controller 225 changes the display mode from the first live view display mode to the second live view display mode. Here, although the display mode is changed to the second live view display mode in order to prevent the photographing opportunity from being lost, it is not necessary to be limited thereto. For example, a short sleep time for the first live view display mode is set, the first live view image 353 temporarily disappears when the sleep time elapses, and the display mode may transition to the sleep state.

The first live view display mode has a normal magnification live view display mode and an enlarged live view display mode. The normal magnification live view display mode is a mode which displays the live view at the normal magnification. The normal magnification live view display mode is suitable for visually recognizing the coarse lateral stripes or the flowing lateral stripes. The enlarged live view display mode is a mode which displays the enlarged live view at the enlargement magnification substantially equal to or more than the pixel equal magnification. The enlarged live view display mode is suitable for visually recognizing lateral stripes of one pixel line. In addition, the first live view display mode further includes an enlarged frame display mode. The enlarged frame display mode is a mode which displays the live view at the same magnification as the normal magnification live view display mode. In the enlarged frame display mode, an enlarged frame 353d is also displayed. An area selected by the enlarged frame 353d may be displayed to be enlarged. Hereinafter, the image displayed in the normal magnification live view display mode is referred to as the normal magnification live view image 353a, the image displayed in the enlarged live view display mode is referred to as an enlarged live view image 353b, and the image displayed in the enlarged frame display mode is referred to as an enlarged frame display image 353c. The enlarged frame display image 353c is an image in which an enlarged frame 353d is added to the normal magnification live view image 353a. The enlarged live view image 353b is a high-definition enlargement image which is displayed by cutting out an area corresponding to the image enclosed by the enlarged frame 353d displayed in the enlarged frame display image 353c from the high-definition image of all pixels in correspondence with the number of pixels of the display 221. The enlarged frame 353d is a frame which designates an area to be enlarged. The enlarged frame 353d is movable up, down, left and right with respect to the enlarged frame display image 353c by depressing the up, down, left and right buttons of the arrow button 321, respectively.

In the normal magnification display mode of the first live view display mode, the system controller 225 changes the normal magnification live view display mode to the enlarged frame display mode by depressing the enlargement button 319 for a short time. As a result, the image to be displayed is changed from the normal magnification live view image 353a to the enlarged frame display image 353c. In the enlarged frame display mode, the enlargement button 319 is depressed for a short time, and the system controller 225 changes the enlarged frame display mode to the enlarged live view display mode. As a result, the image to be displayed is changed from the enlarged frame display image 353c to the enlarged live view image 353b. In the enlarged frame view display mode, the enlargement button 319 is depressed for a short time, and thus the system controller 225 changes the enlarged live view display mode to the normal magnification live view display mode. As a result, the image to be displayed is changed from the enlarged live view image 353b to the normal magnification live view image 353a. As described above, the enlargement button 319 is a button which sequentially (alternately) changes the normal magnification live view display mode, the enlarged live view display mode, and the enlarged frame display mode.

In the first live view image 353, a Sync number (Sync 1, Sync 2, Sync 3, and Sync 4) associated with the shutter speed series are displayed.

In the enlarged frame display image 353c, the enlarged frame 353d can be moved to the position where the fine lateral stripes desired to be confirmed by the user are easily seen by the operation of the arrow button 321.

Practically, a position of the enlarged frame 353d, in other words, a portion displayed in the enlarged live view image 353b, or in other words, a portion to be enlarged is fixed at a predetermined position of the normal magnification live view image 353a such as a center of the normal magnification live view image 353a, and therefore the enlarged frame display mode may also be omitted. In this case, the enlargement button 319 is a button for alternately changing between the normal magnification live view display mode and the enlarged live view display mode. It is possible to more quickly change between the two enlargement magnification states required for detecting lateral stripes by omitting the enlarged frame display image 353c. In addition, in order to prevent deterioration in visibility of lateral stripes due to a background pattern, when the focus lens is attached to the camera body 200, it may be operated so that the lens is automatically focused out only in the first live view display mode.

Figure 4A:
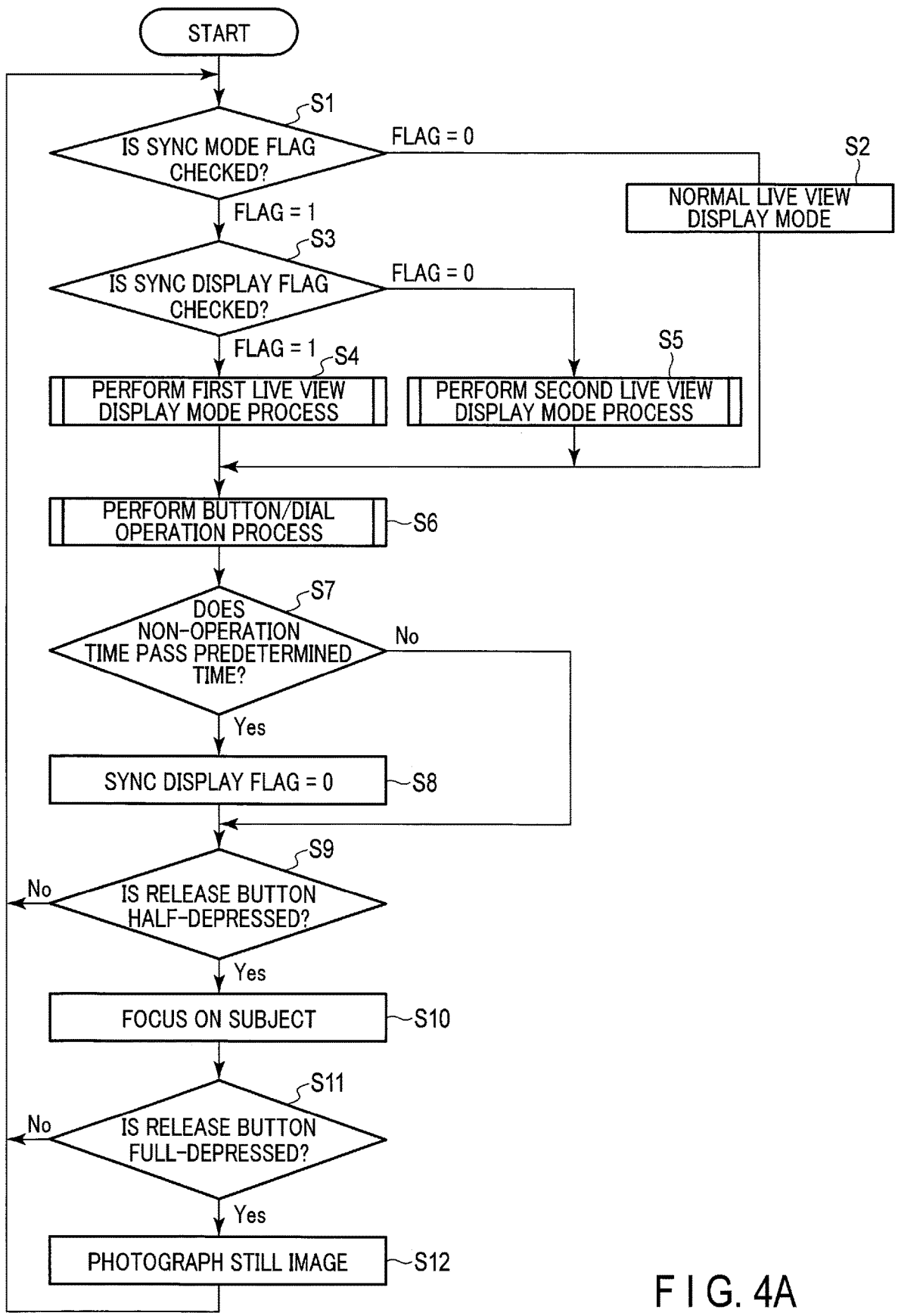
FIG. 4A is a flowchart showing an operation of the camera system for capturing a still image.

Next, the operation of the camera system 1 according to the first embodiment will be described. FIG. 4A is a flowchart showing the operation of the camera system 1 for capturing the still image. The operation of FIG. 4A is mainly controlled by the system controller 225. The operation of FIG. 4A is started when the power button (not shown) is turned on.

In step S1, the system controller 225 checks a SYNC mode flag which is a flag for managing the state of the live view display mode. The SYNC mode flag has two states of 0 and 1. The state of the SYNC mode flag is alternately changed according to a current state of the live view display mode and the operation of the display mode change button 325. If it is determined that the SYNC mode flag is 0, the process proceeds to step S2. In step S2, the system controller 225 performs the live view display in the normal live view display mode. Then, the process proceeds to step S6.

If it is determined in step S1 that the SYNC mode flag is 1, the process proceeds to step S3. In step S3, the system controller 225 checks a SYNC display flag which is a flag for managing the display states of the first and second live view display modes. The SYNC display flag has two states of 0 and 1. The state of the SYNC display flag is alternately changed according to a current state of the first and second live view display modes and the operation of the display mode change button 325. If it is determined that the SYNC display flag is 1, the process proceeds to step S4. In step S4, the system controller 225 proceeds to the first live view display mode process to be described later. Then, the process proceeds to step S6. In addition, if it is determined in step S3 that the SYNC display flag is 0, the process proceeds to step S5. In step S5, the system controller 225 proceeds to the second live view display mode process to be described later. Then, the process proceeds to step S6.

In step S6, the system controller 225 performs the button/dial process to described later, and the process proceeds to step S7.

In step S7, the system controller 225 determines whether the non-operation time for which the display mode change button 325 or the enlargement button 319 is not depressed passes a predetermined time. If it is determined in step S7 that the non-operation time passes the predetermined time, the process proceeds to step S8. In step S8, the system controller 225 sets the SYNC display flag to 0, and the process proceeds to step S9. If it is determined in step S7 that the display mode change button 325 or the enlargement button 319 is depressed before the non-operation time passes a predetermined time, the process proceeds to step S9.

In step S9, the system controller 225 determines whether the release button 313 is half-depressed by the user. If it is determined in step S9 that the release button 313 is not half-depressed, the process returns to step S1. If it is determined in step S9 that the release button 313 is half-depressed, the process proceeds to step S10. In step S10, the system controller 225 controls the lens controller 201 so as to focus on the subject. Thereafter, the process proceeds to step S11.

In step S11, the system controller 225 determines whether the release button 313 is full-depressed by the user. If it is determined in step S11 that the release button 313 is not full-depressed, the process returns to step S1. If it is determined in step S11 that the release button 313 is full-depressed, the process proceeds to step S12. In step S12, the system controller 225 photographs the still image with the set values of the shutter speed, and the process returns to step S1. The photographed still image is displayed on the display 221.

Next, the first live view display mode process shown in step S4 will be described with reference to FIG. 4B. FIG. 4B is a flowchart showing the operation of the camera system 1 for the first live view display mode process. Although the processes in steps S21 to S25 are performed in this order, the order of the performance is not particularly limited.

In step S21, the system controller 225 changes the imaging sequence of the imaging element 206. Specifically, the system controller 225 changes the imaging sequence to a sequence for reading all pixels of the image captured with the value of the shutter speed of the second shutter speed series. Accordingly, the system controller 225 displays the value of the shutter speed on the first live view image 353, for example, up to a first decimal place. By changing the shutter speed series from the first shutter speed series to the second shutter speed series, the system controller 225 can set the shutter speed to be finer than the shutter speed in the normal live view display mode. In addition, the system controller 225 displays the shutter speed, for example, up to the first decimal place, such that the user can check the value of the fine shutter speed. A display digit of the shutter speed is not limited to the first decimal place. Depending on a step value of the shutter speed series, the shutter speed may be displayed after a second decimal place.

However, too fine steps are wasteful, and it meaninglessly takes time for the user to change the shutter speed. Therefore, for example, a long second time side exceeding $1/24$ is the same as the first shutter speed series, or it may be omitted. This may go the same for a super high speed side, and therefore for example, a high speed shutter exceeding $1/4000$ may be omitted. Therefore, the first shutter speed series is in the range of 60 to $1/32000$, whereas the second shutter speed series of the first embodiment is limited to a narrow range of $1/60$ to $1/1000$. However, the second shutter speed series of the first embodiment is not limited thereto, and it may be configured so as to have a fine shutter speed only in a middle speed region of the first shutter speed series.

In step S22, when the first live view display mode is performed, the system controller 225 performs process of invalidating menu setting for the normal live view display mode. Specifically, the system controller 225 invalidates a function for realizing an ideal finder function for capturing a subject. This function has, for example, a function of a live view boost, a function of adjusting a frame rate, and a function of reducing flicker.

The function of the live view boost is a function of automatically adjusting the brightness of the image displayed in the live view. When the function of the live view boost is turned off in the normal live view display mode, the system controller 225 performs exposure correction simulation or color simulation. However, in the first live view display mode, the system controller 225 preferentially performs the detection capability of the lateral stripes to invalidate this performance. When the function of the live view boost is turned on in the normal live view display mode, the system controller 225 increases a gain or delays the frame rate when the normal live view image 351 is dark to secure the brightness of the normal live view image 351. However, in the first live view display mode, since the frame rate is fixed in order to accurately detect the lateral stripes, the system controller 225 invalidates the function of securing the brightness of the normal live view image 351.

The function of adjusting the frame rate is the function of automatically adjusting the frame rate when the live view display is performed. When the frame rate is set to standard in the normal live view display mode, the system controller 225 sets the frame rate to a standard frame rate (for example, 30 fps). However, in the first live view display mode, the system controller 225 invalidates the setting of the frame rate. In addition, when the frame rate is set to a high speed in the normal live view display mode, the system controller 225 sets the frame rate to a high-speed frame rate (for example, 120 fps). However, in the first live view display mode, the setting of the frame rate is invalidated. That is, in the first live view display mode, the frame rate is set to a predetermined frame rate which is neither the standard nor the high speed.

The function of reducing the flicker is a function of delaying the frame rate so that the flicker does not occur in the image displayed in the live view, and hinders the detection of the lateral stripes. Therefore, in the first embodiment, the system controller 225 sets so that the flicker reduction is not performed regardless of the setting of the flicker reduction.

In step S23, the system controller 225 performs process of prohibiting the use of the operation member for the normal live view display mode. Specifically, in order to determine the shutter speeds in the first and second live view display modes, the system controller 225 invalidates the use of all operation members other than the operation member used for determining the shutter speed.

In step S24, the image processor 213 performs the image process for the first live view display mode. Specifically, the image processor 213 makes the first live view image 353 high contrast so that the lateral stripes in the first live view image 353 can be easily recognized visually. The image processor 213 may change a hue or the like of the first live view image 353, such as the monochromatization for visually recognizing the lateral stripes. By changing the hue, the user can clearly recognize the transition between the first live view and the second live view from the normal live view by depressing the button.

In step S25, the system controller 225 sets a predetermined time for the non-operation time described in step S7. The system controller 225 may set the value recorded in the nonvolatile memory 223 in advance to a predetermined time or may set the value input from the operation unit 227 to a predetermined time. After step S25, the process proceeds to step S26.

In step S26, the system controller 225 performs enlargement magnification setting process, which is the process of setting the enlargement magnification to be described later. The enlargement magnification is set as the enlargement magnification in the enlarged live view display mode of the first live view display mode.

In step S27, the system controller 225 checks an enlarged flag which is a flag for managing the state of the first live view display mode. The enlarged flag has three states of 0, 1, and 2. The state of the enlarged flag is sequentially changed according to the operation of the enlargement button 319. If it is determined that the enlarged flag is 0, the process proceeds to step S28. In step S28, the system controller 225 performs the normal magnification live view display mode. If it is determined that the enlarged flag is 1, the process proceeds to step S29. In step S29, the system controller 225 performs the enlarged frame display mode. If it is determined that the enlarged flag is 2, the process proceeds to step S30. In step S30, the system controller 225 performs the enlarged live view display mode. After step S28, S29, or S30, the process proceeds to step S6.

Figure 4C:
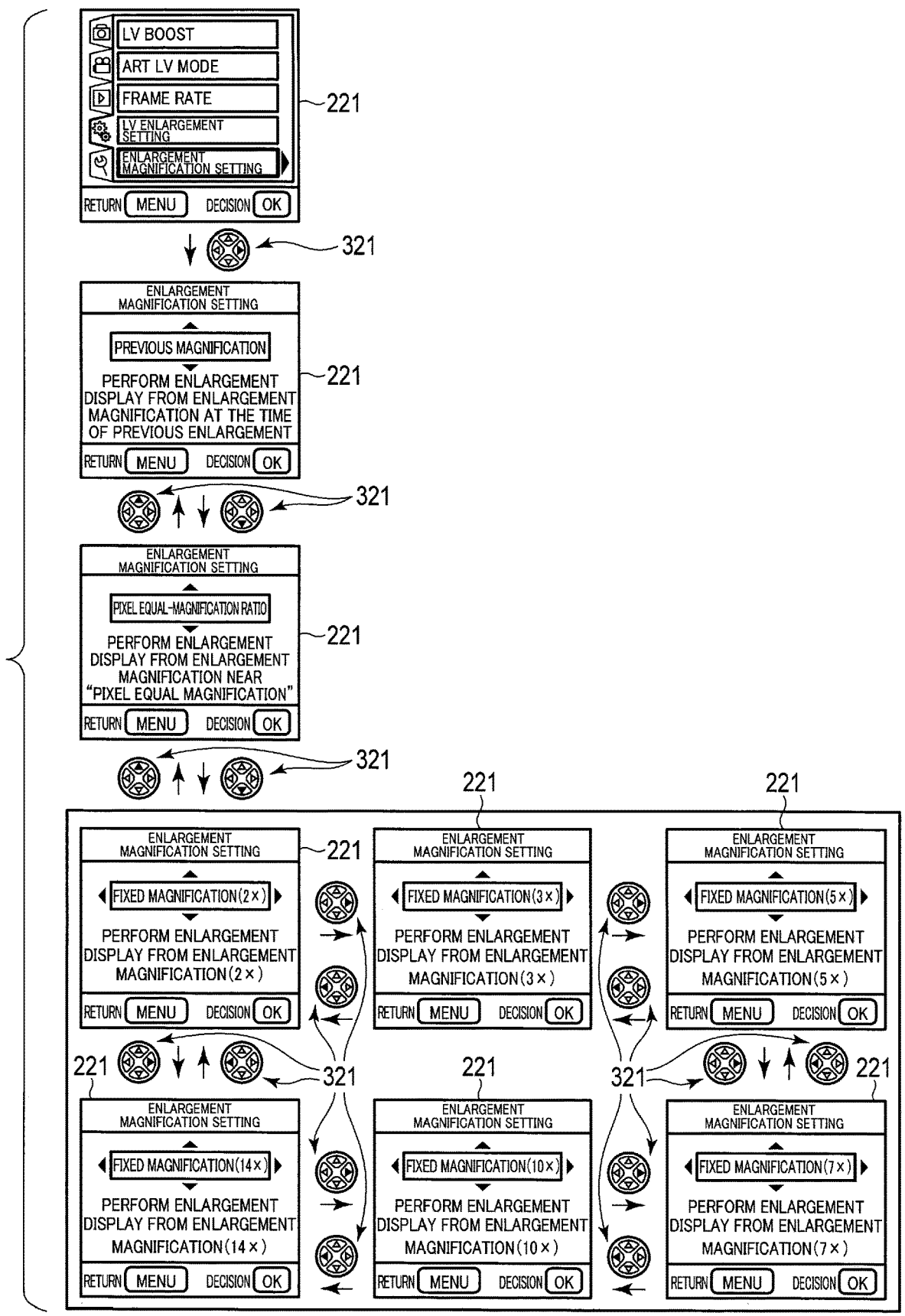
FIG. 4C is a diagram for describing setting of an enlargement magnification on a setting screen.

Here, the operation of setting the enlargement magnification in step S26 (enlargement magnification setting process) will be described with reference to FIG. 4C. FIG. 4C is a diagram for describing the setting of the enlargement magnification on the setting screen of the enlargement magnification displayed on the display 221.

The enlargement magnification is selected by the user from a magnification (hereinafter, referred to as the previous magnification) used at the time of the previous enlargement, a magnification (hereinafter, referred to as the pixel equal-magnification ratio) near the pixel equal magnification, and a preset fixed magnification. The respective values of the previous magnification and the fixed magnification are recorded in the nonvolatile memory 223. The pixel equal-magnification ratio is calculated by the pixel equal-magnification ratio specific process to be described later.

The menu item "enlargement magnification setting" is selected from a custom menu displayed on the display 221 by allowing the user to operate the up button or the down button of the arrow button 321, for example. When the right button of the arrow button 321 is depressed in a state in which the "enlargement magnification setting" is selected, the "enlargement magnification setting" screen is called up and the menu item "previous magnification" is displayed. When the down button of the arrow button 321 is depressed in a state in which the menu item "previous magnification" is displayed on the "enlargement magnification setting" screen, the display of the menu item is changed to the menu item "pixel equal-magnification ratio". When the down button is depressed in a state in which the menu item "pixel equal-magnification ratio" is displayed on the "enlargement magnification setting" screen, the display of the menu item is changed to the menu item "fixed magnification". When the up button of the arrow button 321 is depressed in a state in which the menu item "fixed magnification" is displayed on the "enlargement magnification setting" screen, the display of the menu item is changed to the menu item "pixel equal-magnification ratio". When the up button is pressed in a state in which the menu item "pixel equal-magnification ratio" is displayed on the "enlargement magnification setting" screen, the display of the menu item is changed to the menu item "previous magnification". As described above, the display of the menu item on the "enlargement magnification setting" screen is sequentially changed by the operations of the up button or the down button.

The fixed magnification has, for example, 2 times, 3 times, 5 times, 7 times, 10 times, and 14 times as magnification values. When the left button or the right button of the arrow button 321 is pressed in a state in which the fixed magnification is displayed on the "enlargement magnification setting" screen, the values of the fixed magnification are sequentially changed. In the first live view display mode, the fixed magnification may be limited to the lowest magnification (for example, two times) or the highest magnification (for example, 14 times) from a plurality of magnifications recorded in advance.

When the OK button 323 is depressed in a state in which one of the previous magnification, the pixel equal-magnification ratio, and the fixed magnification is selected by the arrow button 321, the selected magnification is set to the enlargement magnification. As described above, the enlargement magnification is set to any one of the previous magnification, the pixel equal-magnification ratio, and the fixed magnification by allowing the user visually observing the setting screen to operate the arrow button 321 and the OK button 323.

In the first live view display mode, the enlargement magnification that can be set is a setting of a significant enlargement magnification for lateral stripes of each pixel line. The enlargement magnification may be limited only to a magnification equal to or more than the pixel equal-magnification ratio. In this case, the pixel equal-magnification ratio is calculated by the pixel equal-magnification ratio specific process to be described later. In addition, the enlargement magnification may be automatically set to a predetermined magnification equal to or more than the pixel equal-magnification ratio without being set by the user. The enlargement magnification can also be changed by the F-dial 317.

Next, the enlargement magnification setting process in step S26 will be described with reference to FIG. 4D. FIG. 4D is a flowchart showing the operation of the camera system 1 for the enlargement magnification setting process.

In step S41, the system controller 225 determines which one of the previous magnification, the fixed magnification, and the pixel equal-magnification ratio the enlargement magnification is set to by allowing the user to operate the arrow button 321 and the OK button 323.

If it is determined in step S41 that the previous magnification is set (designated) to the enlargement magnification, the process proceeds to step S42. In step S42, the system controller 225 sets the previous magnification to the enlargement magnification.

If it is determined in step S41 that the fixed magnification is set (designated) to the enlargement magnification, the process proceeds to step S43. In step S43, the system controller 225 sets the fixed magnification set by the user to the enlargement magnification.

If it is determined in step S41 that the pixel equal-magnification ratio is set (designated) to the enlargement magnification, the process proceeds to step S44. In step S44, the system controller 225 performs the pixel equal-magnification ratio specific process to be described later.

After steps S42, S43, or S44, the process proceeds to step S45. In step S45, the system controller 225 checks the SYNC flag and the SYNC display flag. If it is determined that the SYNC flag is 1 and the SYNC display flag is 1, the process proceeds to step S46. In step S46, the system controller 225 checks the currently set enlargement magnification, and if the current magnification is less than the pixel equal-magnification ratio, the system controller 225 sets the enlargement magnification to a recommended enlargement magnification which is the magnification equal to or more than the pixel equal-magnification ratio. In step S46, in the first live view display mode, the enlargement magnification is forcibly set to the recommended enlargement magnification. Thereafter, the process proceeds to step S27. In addition, if it is determined in Step S45 that the SYNC flag is 0 or the SYNC flag is 1 and the SYNC display flag is 0, the process proceeds to step S27. When the fixed magnification which can be set is limited to the magnification equal to or more than the pixel equal-magnification ratio, the processes of steps S45 and S46 may be omitted.

Figure 4E:
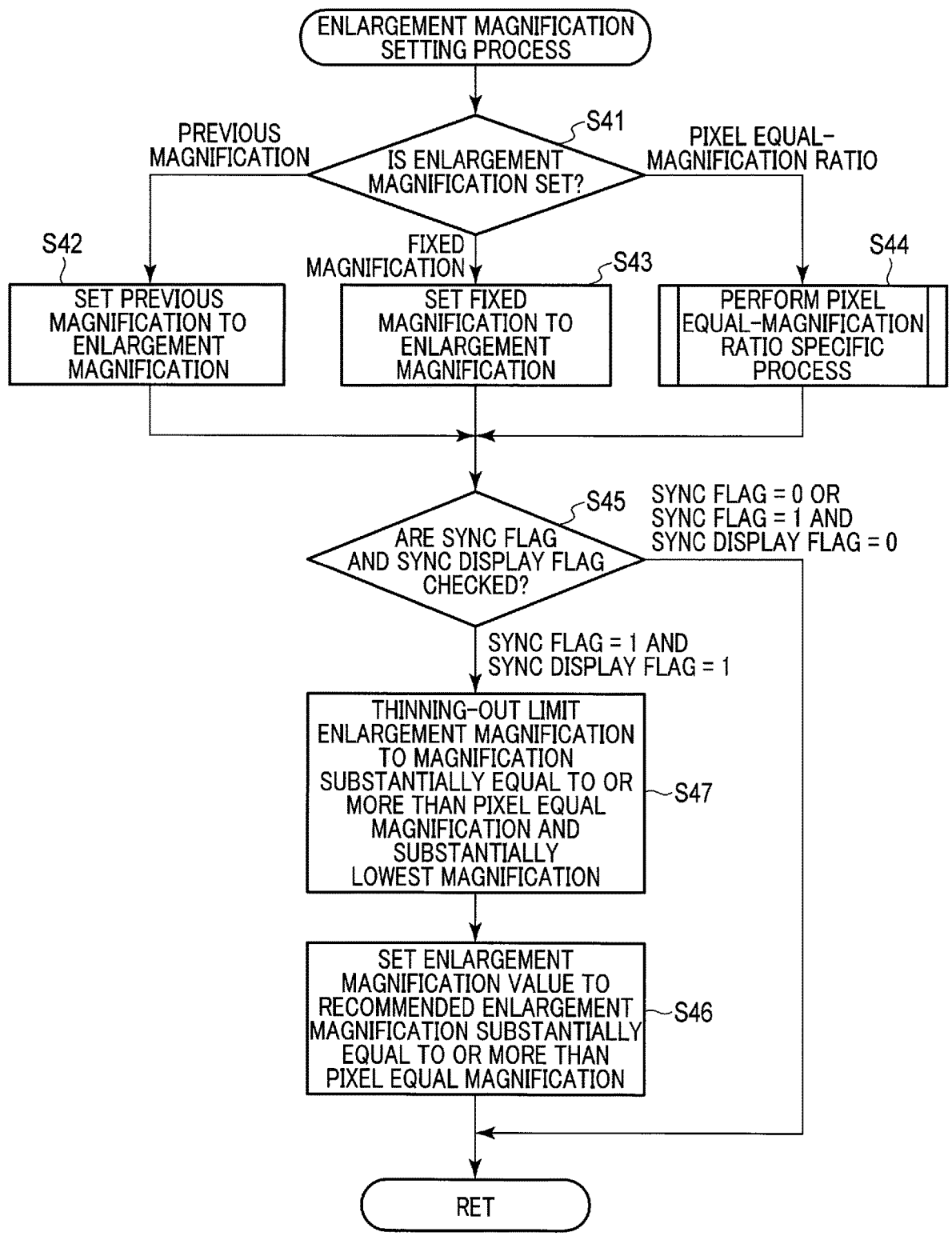
FIG. 4E is a flowchart showing the operation of the camera system for a modification of the enlargement magnification setting process.

Next, a modification of the enlargement magnification setting process in step S26 will be described with reference to FIG. 4E. FIG. 4E is a flowchart showing the operation of the camera system 1 for the modification of the enlargement magnification setting process. In this flowchart, step S47 is added between step S45 and step S46 in the flowchart shown in FIG. 4D.

In step S47, the system controller 225 limits the enlargement magnification by thinning out the enlargement magnification to a magnification substantially equal to or more than the pixel equal magnification and a substantially lowest magnification. Then, the process proceeds to step S46.

Figure 4F:
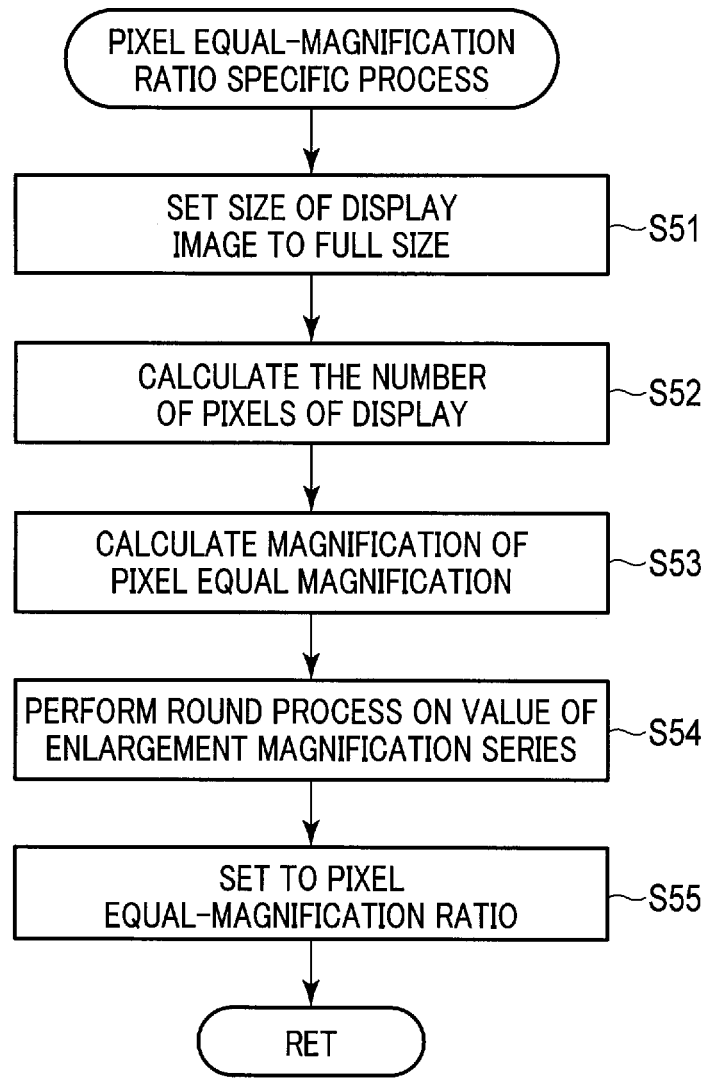
FIG. 4F is a flowchart showing the operation of the camera system for pixel equal-magnification ratio specifying process.

Next, the pixel equal-magnification ratio specific process in step S44 will be described with reference to FIG. 4F. FIG. 4F is a flowchart showing the operation of the camera system 1 for the pixel equal-magnification ratio specific process.

In step S51, the system controller 225 sets a size of the display image to a full size. The process proceeds to step S52, and in step S52, the system controller 225 calculates the number of pixels of the display 221. In step S53, the system controller 225 calculates the magnification of the pixel equal magnification based on the size of the image to be displayed and the number of pixels of the display 221. In step S54, the system controller 225 performs rounding process on the calculated magnification based on the value of the enlargement magnification (for example, the value of the fixed magnification) which can be set. The process proceeds to step S55, and in step S55, the system controller 225 sets the value calculated by the rounding process to the pixel equal-magnification ratio. Then, the process proceeds to step S45.

Figure 4G:
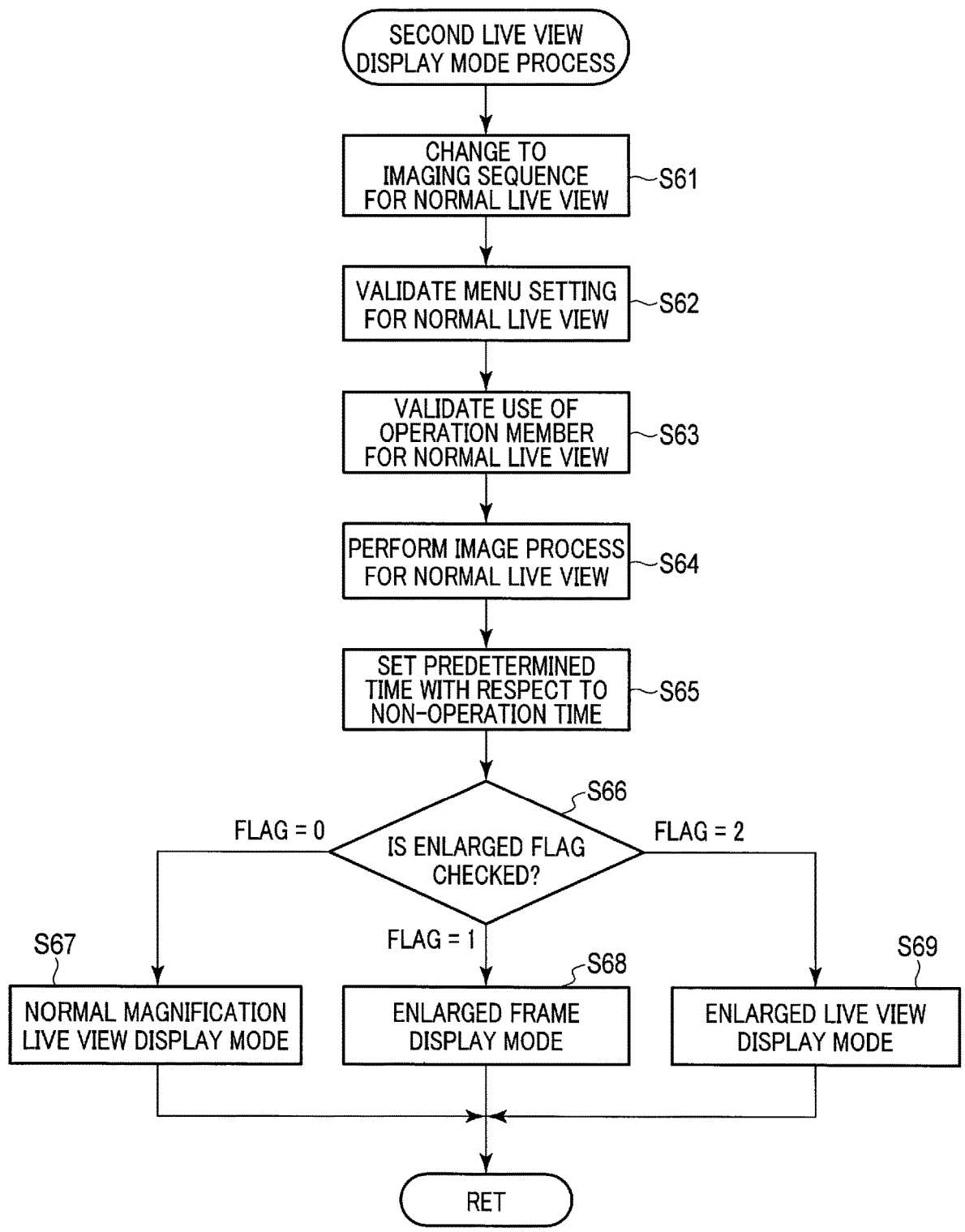
FIG. 4G is a flowchart showing the operation of the camera system for second live view display mode process.
Figure 41:
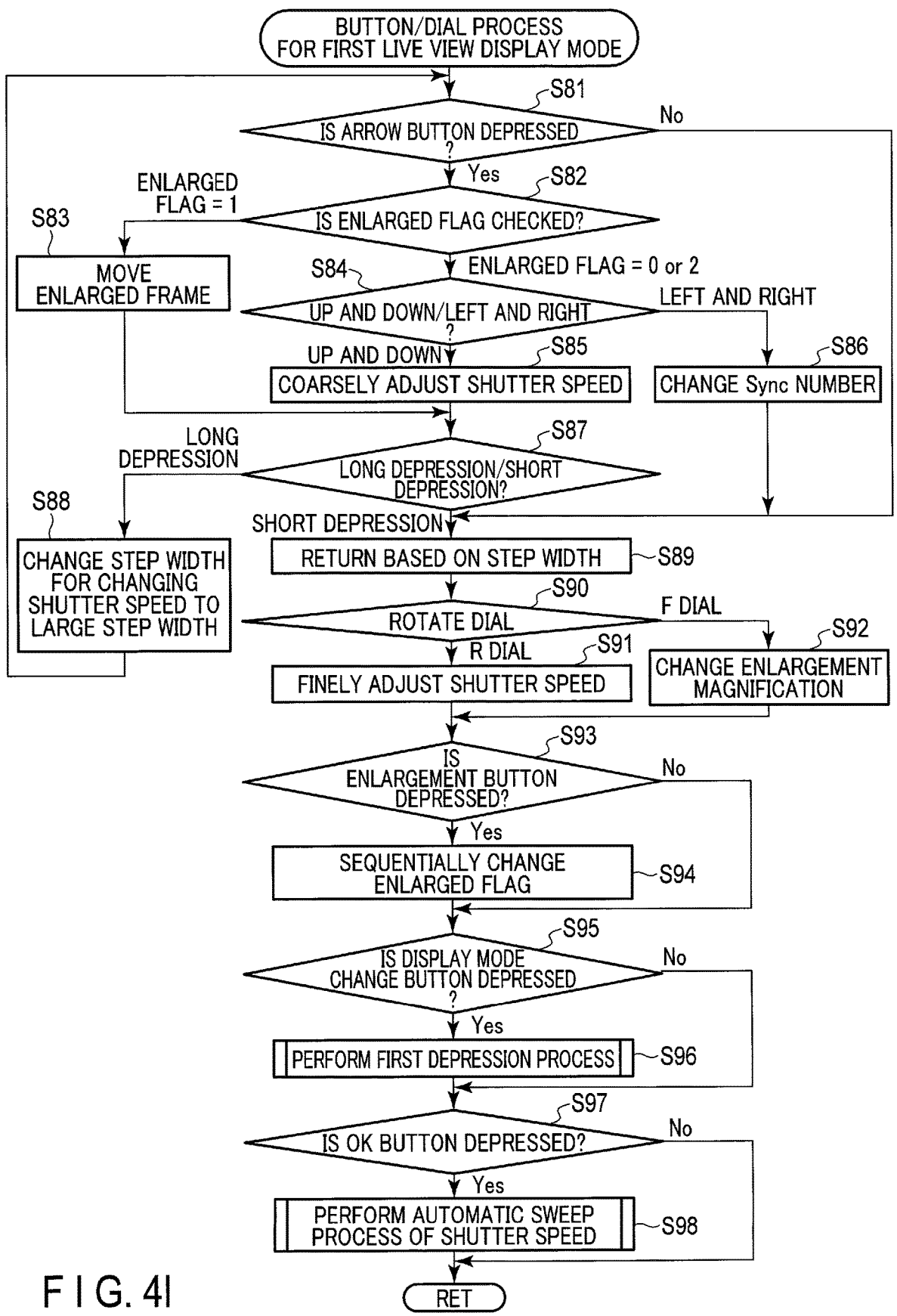

Next, the second live view display mode process shown in step S5 will be described with reference to FIG. 4G. FIG. 4G is a flowchart showing the operation of the camera system 1 for the second live view display mode process. Although the processes in steps S61 to S65 are performed in this order, the order of the performance is not particularly limited. In steps S61 to S65, the system controller 225 resets the setting so as to be the same as the normal live view display mode.

In step S61, the system controller 225 changes the imaging sequence of the imaging element 206 to the imaging sequence for the normal live view display mode. Specifically, the system controller 225 changes the imaging sequence to the imaging sequence for performing the addition of pixels or the thinning-out reading of pixels on the image captured with the value of the shutter speed of the first shutter speed series. Accordingly, the system controller 225 displays the value of the shutter speed displayed on the second live view image 355, for example, up to one's place. By changing the shutter speed series from the second shutter speed series to the first shutter speed series, the system controller 225 can set the shutter speed to be coarser than the shutter speed in the first live view display mode. In addition, the system controller 225 displays the value of the shutter speed, for example, up to the one's place, so that the user can coarsely confirm the value of the shutter speed.

In step S62, the system controller 225 performs process of validating the menu setting for the normal live view display mode. Specifically, the system controller 225 validates a function for realizing an ideal finder function for capturing a subject. This function has, for example, the function of the live view boost, the function of adjusting the frame rate, and the function of reducing the flicker which are described in the above-described step S22.

In step S63, the system controller 225 performs process of validating the use of the operation member for the normal live view display mode.

In step S64, the image processor 213 performs the image process for the normal live view display mode. This image process includes basic image process such as white balance correction process.

In step S65, the system controller 225 sets a predetermined time for the non-operation time described in step S7. After step S65, the process proceeds to step S66.

In step S66, the system controller 225 checks an enlarged flag which is a flag for managing the state of the second live view display mode. The enlarged flag has three states of 0, 1, and 2. The state of the enlarged flag is sequentially changed according to the operation of the enlargement button 319. If it is determined that the enlarged flag is 0, the process proceeds to step S67. In step S67, the system controller 225 performs the process in the normal magnification live view display mode. By performing the process in the normal live view display mode, the second live view image 355 can be displayed. If it is determined that the enlarged flag is 1, the process proceeds to step S68. In step S68, the system controller 225 performs the process in the enlarged frame display mode. By performing the process in the enlarged frame display mode, the enlarged frame display image (not shown) in which the enlarged frame (not shown) is added to the second live view image 355 can be displayed. If it is determined that the enlarged flag is 2, the process proceeds to step S69. In step S69, the system controller 225 performs the enlarged live view display mode, and can display the enlarged live view image (not shown) obtained by enlarging the image enclosed by the enlarged frame (not shown) displayed in the enlarged frame display image (not shown). After steps S67, S68, or S69, the process proceeds to step S6.

Next, the button/dial process shown in step S6 will be described with reference to FIG. 4H. FIG. 4H is a flowchart showing the operation of the camera system 1 for the button/dial process. In step S71, the system controller 225 checks the state of the SYNC mode flag and the state of the SYNC display flag, respectively, in order to check which state the live view display mode is in.

If it is determined in step S71 that the SYNC mode flag is 1 and the SYNC display flag is 1, the process proceeds to step S72. In step S72, the system controller 225 performs the button/dial process for the first live view display mode to be described later. Then, the process proceeds to step S7.

If it is determined in step S71 that the SYNC mode flag is 1 and the SYNC display flag is 0, the process proceeds to step S73. In step S73, the system controller 225 performs the button/dial process for the second live view display mode to be described later. Then, the process proceeds to step S7.

If it is determined in step S71 that the SYNC mode flag is 0, the process proceeds to step S74. In step S74, the system controller 225 performs the button/dial process for the normal live view display mode to be described later. Then, the process proceeds to step S7.

Next, the button/dial process for the first live view display mode shown in step S72 will be described with reference to FIG. 4I. FIG. 4I is a flowchart showing the operation of the camera system 1 for the button/dial process for the first live view display mode.

In step S81, the system controller 225 determines whether the arrow button 321 is depressed by the user. If it is determined that the arrow button 321 is not depressed, the process proceeds to step S89. If it is determined that arrow button 321 is depressed, the process proceeds to step S82.

In step S82, the system controller 225 checks the enlarged flag. If it is determined in step S82 that the enlarged flag is 1, the process proceeds to step S83. At this time, the live view display mode is changed to the enlarged frame display mode, and the enlarged frame display image 353c is displayed. In step S83, the system controller 225 depresses the up, down, left, and right buttons of the arrow button 321, respectively, to move the enlarged frame 353d in the enlarged frame display image 353c. The process proceeds to step S87.

If it is determined in step S82 that the enlarged flag is 0 or 2, the process proceeds to step S84. At this time, the live view display mode is changed to the normal magnification live view display mode or the enlarged live view display mode. In addition, the normal magnification live view image 353a or the enlarged live view image 353b is displayed.

In step S84, the system controller 225 determines which the up and down buttons and the left and right buttons of the arrow button 321 are operated by the user. If it is determined in step S84 that the up button or the down button is depressed, the process proceeds to step S85. In step S85, the system controller 225 changes the shutter speed by a coarse step. A step width is stored in the nonvolatile memory 223 in advance. When step S85 ends, the process proceeds to step S87.

If it is determined in step S84 that the left button or the right button is depressed, the process proceeds to step S86. In step S86, the system controller 225 changes a Sync number. Each shutter speed is associated with the Sync number, and the shutter speed is changed by changing the Sync number. The arrow button 321 is a button for changing the shutter speed from a plurality of shutter speeds simultaneously displayed on the display 221 to one shutter speed. When step S86 ends, the process proceeds to step S89.

In step S87, the system controller 225 determines whether the up and down buttons of the arrow button 321 are depressed for a long time or a short time by the user. If it is determined that the up and down buttons are depressed for a long time, the process proceeds to step S88. In step S88, the system controller 225 changes the step width for changing the shutter speed to the step width larger than the step width used in step S85. The changed step width is stored in the nonvolatile memory 223 in advance. Then, the process proceeds to step S81. If it is determined in step S87 that the display mode change button 325 is depressed for a short time by the user, the process proceeds to step S89. In step S89, the system controller 225 returns based on the step width. Then, the process proceeds to step S90. Returning based on the step size corresponds to reducing the step width which is largely changed.

In step S90, the system controller 225 determines which one of the R-dial 315 for changing the shutter speed and the F-dial 317 for changing the enlargement magnification is operated. If it is determined in step S90 that the R-dial 315 is operated, the process proceeds to step S91. In step S91, the system controller 225 changes the shutter speed with the finer step than the step in step S85, that is, fine-tunes the shutter speed. The step width is stored in the nonvolatile memory 223 in advance. Then, the process proceeds to step S93. In steps S85, S88, and S91, the shutter speed is changed with the coarse step or the fine step depending on the difference in the operation methods such as the up/down buttons or the R-dial 315.

If it is determined in step S90 that the F-dial 317 is operated, the process proceeds to step S92. In step S92, the system controller 225 changes the enlargement magnification to the enlargement magnification set in the enlargement magnification setting process. Then, the process proceeds to step S93.

In step S93, the system controller 225 determines whether the enlargement button 319 is operated by the user. If it is determined in step S93 that the enlargement button 319 is depressed, the process proceeds to step S94. In step S94, the system controller 225 sequentially changes the states of the enlarged flags in the order of 0, 1, 2, 0, . . . . Then, the process proceeds to step S95. If it is determined in step S93 that the enlargement button 319 is not depressed, the process proceeds to step S95.

In step S95, the system controller 225 determines whether the display mode change button 325 is depressed by the user. If it is determined in step S95 that the display mode change button 325 is depressed, the process proceeds to step S96. In step S96, the system controller 225 performs the first depression process of the display mode change button 325 to be described later. Then, the process proceeds to step S97. If it is determined in step S95 that the display mode change button 325 is not depressed, the process proceeds to step S97.

In step S97, the system controller 225 determines whether the OK button 323 is depressed by the user. If it is determined in step S97 that the OK button 323 is depressed, the process proceeds to step S98. In step S98, the system controller 225 performs the automatic sweep process of the shutter speed to be described later. Then, the process proceeds to step S7. If it is determined in step S97 that the OK button 323 is not depressed, the process proceeds to step S7.

Figure 4J:
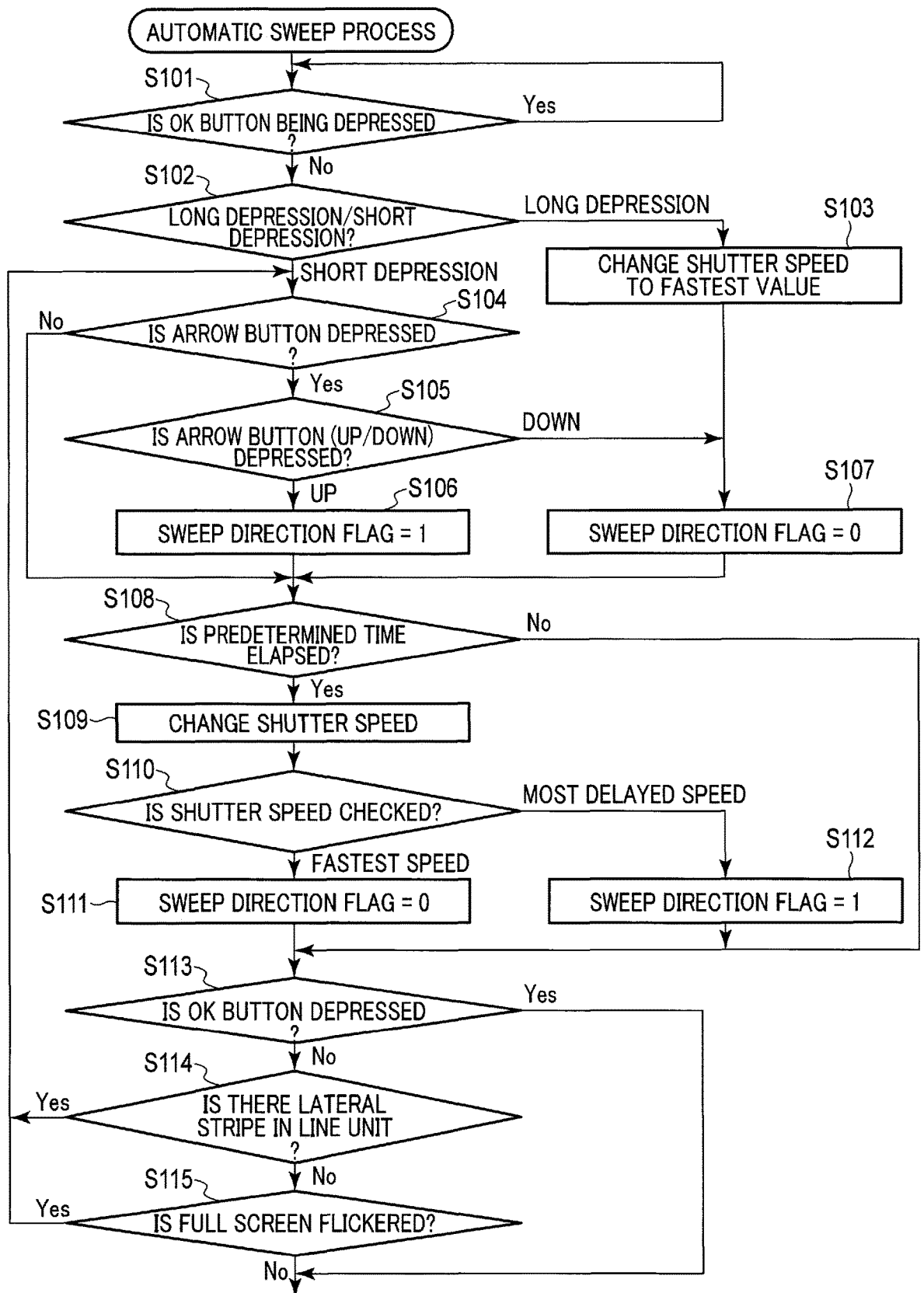
FIG. 4J is a flowchart showing the operation of the camera system for automatic sweep process.

Next, the automatic sweep process shown in step S98 will be described with reference to FIG. 4J. FIG. 4J is a flowchart showing the operation of the camera system 1 for the automatic sweep process.

In the first live view display mode, the shutter speed series has values of a large number of shutter speeds with the finer steps such as 1/50 step to 1/500 step. In this case, it takes time for the user to manually set the shutter speed from these shutter speeds. The system controller 225 automatically sweeps the shutter speed by depressing the OK button 323 by the user in order to omit this time.

In step S101, the system controller 225 determines whether the OK button 323 is continuously depressed by the user. If it is determined in step S101 that the OK button 323 is continuously depressed, the process proceeds to step S101. If it is determined in step S101 that continuously keeping the OK button 323 is released, the process proceeds to step S102. In step S102, the system controller 225 determines whether the OK button 323 is depressed for a long time or for a short time by the user. When the OK button 323 is depressed in the first live view display mode, the system controller 225 is configured to start the automatic sweep process of the shutter speed shown below.

If it is determined in step S102 that the OK button 323 is depressed for a long time, the process proceeds to step S103. In step S103, the system controller 225 changes the shutter speed to the fastest value. Thereafter, the process proceeds to step S107.

If it is determined in step S102 that the OK button 323 is depressed for a short time by the user, the process proceeds to step S104. In step S104, the system controller 225 determines whether the arrow button 321 is depressed by the user. If it is determined in step S104 that the arrow button 321 is not depressed by the user, the process proceeds to step S108.

If it is determined in step S104 that the arrow button 321 is depressed by the user, the process proceeds to step S105. In step S105, it is determined which of the up button and the down button of the arrow button 321 is depressed by the user. If it is determined that the up button is depressed, the process proceeds to step S106. In step S106, the system controller 225 sets a sweep direction flag, which is a flag for managing a sweep direction, to 1. The process proceeds to step S108. If it is determined in step S105 that the down button is depressed, the process proceeds to step S107. In step S107, the system controller 225 sets the sweep direction flag to 0. Changing the sweep direction in this way can be changed by depressing the up and down buttons of the arrow button 321. Thereafter, the process proceeds to step S108.

In step S108, the system controller 225 determines whether a predetermined period elapses. When the predetermined time does not elapse, the process proceeds to step S113. When the predetermined time elapses, the process proceeds to step S109. In step S109, the system controller 225 changes the shutter speed. Normally, it is desirable that the shutter speed is a high-speed side corresponding to one cycle of flickering of LED. Therefore, when the OK button 323 is depressed for a long time in step S102, the system controller 225 starts the sweep from the fastest value among the values of the shutter speed series in the direction of the long second time. In addition, by the short depressing of the OK button 323 in step S102, the system controller 225 sweeps the shutter speed from the setting value of the currently stored shutter speed in the sweep direction according to the sweep direction flag. Thereafter, the process proceeds to step S110. In step S110, the system controller 225 checks the shutter speed. In step S110, when the changed shutter speed is the fastest speed, the process proceeds to step S111. In step S111, the system controller 225 sets the sweep direction flag to 0. In step S110, when the changed shutter speed is the most delay speed, the process proceeds to step S112. In step S112, the system controller 225 sets the sweep direction flag to 1. After steps S111 or S112, the process proceeds to step S113. In steps S108 to S113, the shutter speed is changed every predetermined time.

In step S113, the system controller 225 determines whether the OK button 323 is depressed by the user during the sweep. If it is determined in step S113 that the OK button 323 is depressed, the sweep is stopped and the process proceeds to step S7.

If it is determined in step S113 that the OK button 323 is not depressed by the user, the process proceeds to step S114. In step S114, the system controller 225 determines whether there are the lateral stripes in a line unit. In step S114, the system controller 225 calculates an average luminance value for each horizontal line and detects whether there is periodicity of light and dark in a vertical direction. If it is determined in step S114 that there are the lateral stripes in the line unit, the process proceeds to step S104.

If it is determined in step S114 that there are no lateral stripes in the line unit, the process proceeds to step S115. In step S115, the system controller 225 determines whether the full screen flickers. The system controller 225 obtains the average luminance value of the full screen and detects whether there is periodicity of light and dark for each frame from the change in the average luminance value for each frame. If it is determined that the full screen does not flicker, the process proceeds to step S7. If it is determined in step S115 that the full screen flickers, the process proceeds to step S104.

Figure 4K:
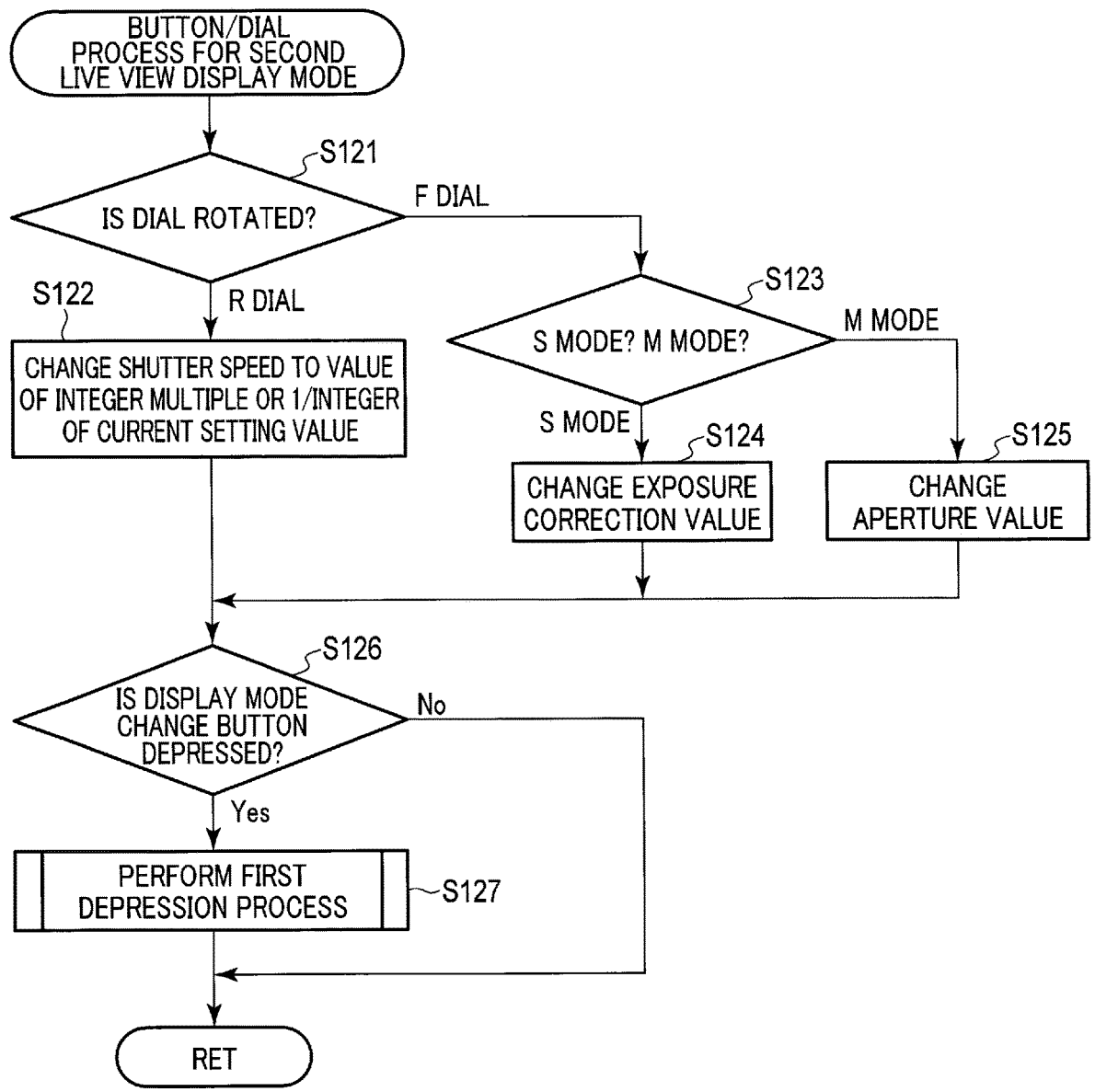
FIG. 4K is a flowchart showing the operation of the camera system for a button/dial process for the second live view display mode.

Next, the button/dial process for the second live view display mode shown in step S73 will be described with reference to FIG. 4K. FIG. 4K is a flowchart showing the operation of the camera system 1 for the button/dial process for the second live view display mode.

In step S121, the system controller 225 determines which one of the R-dial 315 for changing the shutter speed and the F-dial 317 for changing the photographing mode is rotated by the user.

If it is determined in step S121 that the R-dial 315 is rotated, the process proceeds to step S122. In step S122, the system controller 225 changes the set shutter speed to a value which is a value of an integral multiple or 1/integer of a current setting value. Thereafter, the process proceeds to step S126.

If it is determined in step S121 that the F-dial 317 is rotated, the process proceeds to step S123. In step S123, the system controller 225 determines whether the photographing mode is an S mode or an M mode. If it is determined in step S123 that the photographing mode is the S mode, the process proceeds to step S124. In step S124, the system controller 225 changes the exposure correction value. Thereafter, the process proceeds to step S126. If it is determined in step S123 that the photographing mode is the M mode, the process proceeds to step S125. In step S125, the system controller 225 changes the aperture value, and the process proceeds to step S126.

In step S126, the system controller 225 determines whether the display mode change button 325 is depressed by the user. If it is determined in step S126 that the display mode change button 325 is not depressed, the process proceeds to step S7. If it is determined in step S126 that the display mode change button 325 is depressed, the process proceeds to step S127. In step S127, the system controller 225 performs the first depression process of the display mode change button 325 to be described later. Then, the process proceeds to step S7.

Figure 4L:
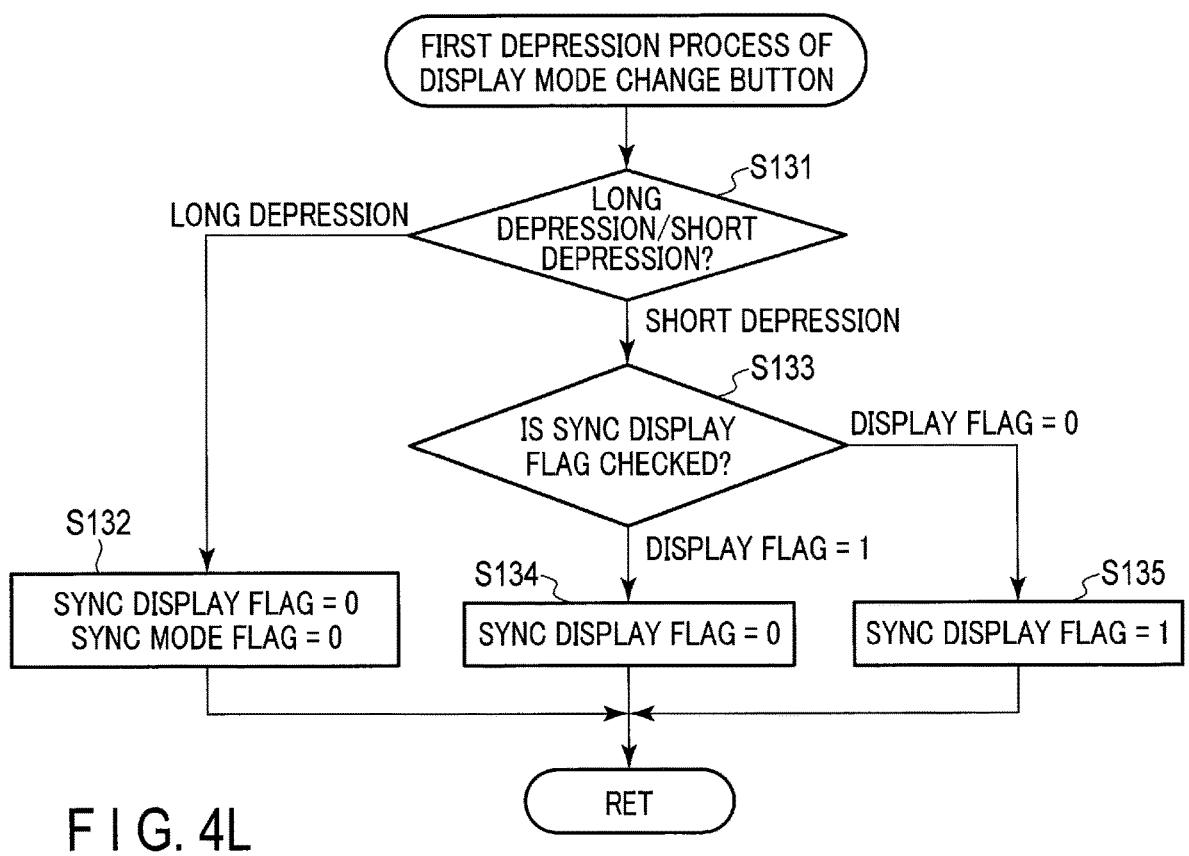
FIG. 4L is a flowchart showing the operation of the camera system for first depression process of a display mode change button.

Next, the first depression process of the display mode change button 325 shown in steps S96 and S127 will be described with reference to FIG. 4L. FIG. 4L is a flowchart showing the operation of the camera system 1 for the first depression process of the display mode change button 325.

In step S131, the system controller 225 determines whether the display mode change button 325 is depressed for a long time or for a short time by the user.

If it is determined in step S131 that the display mode change button 325 is depressed for a long time, the process proceeds to step S132. In step S132, the system controller 225 sets the SYNC mode flag to 0 and sets the SYNC display flag to 0. The process proceeds to step S97 or step S7.

If it is determined in step S131 that the display mode change button 325 is depressed for a short time, the process proceeds to step S133. In step S133, the system controller 225 checks the SYNC display flag and determines whether the SYNC display flag is 0 or 1. If it is determined in step S133 that the SYNC display flag is 1, the process proceeds to step S134. In step S134, the system controller 225 sets the SYNC display flag to 0. The process proceeds to step S97 or step S7. If it is determined in step S133 that the SYNC display flag is 0, the process proceeds to step S135. In step S135, the system controller 225 sets the SYNC display flag to 1. Thereafter, the process proceeds to step S97 or step S7.

Figure 4M:
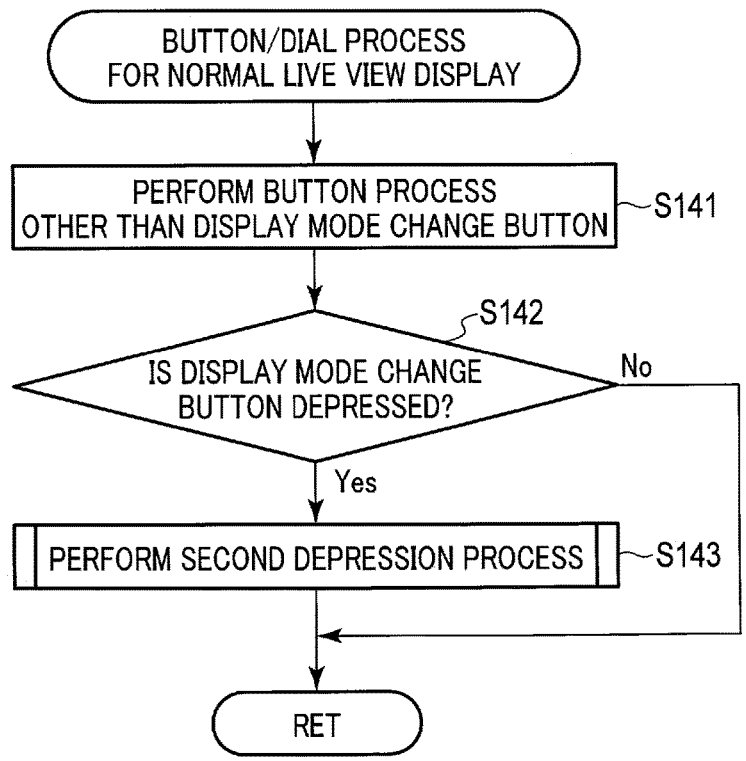
FIG. 4M is a flowchart showing the operation of the camera system for button/dial process for a normal live view display mode.
Figure 40:
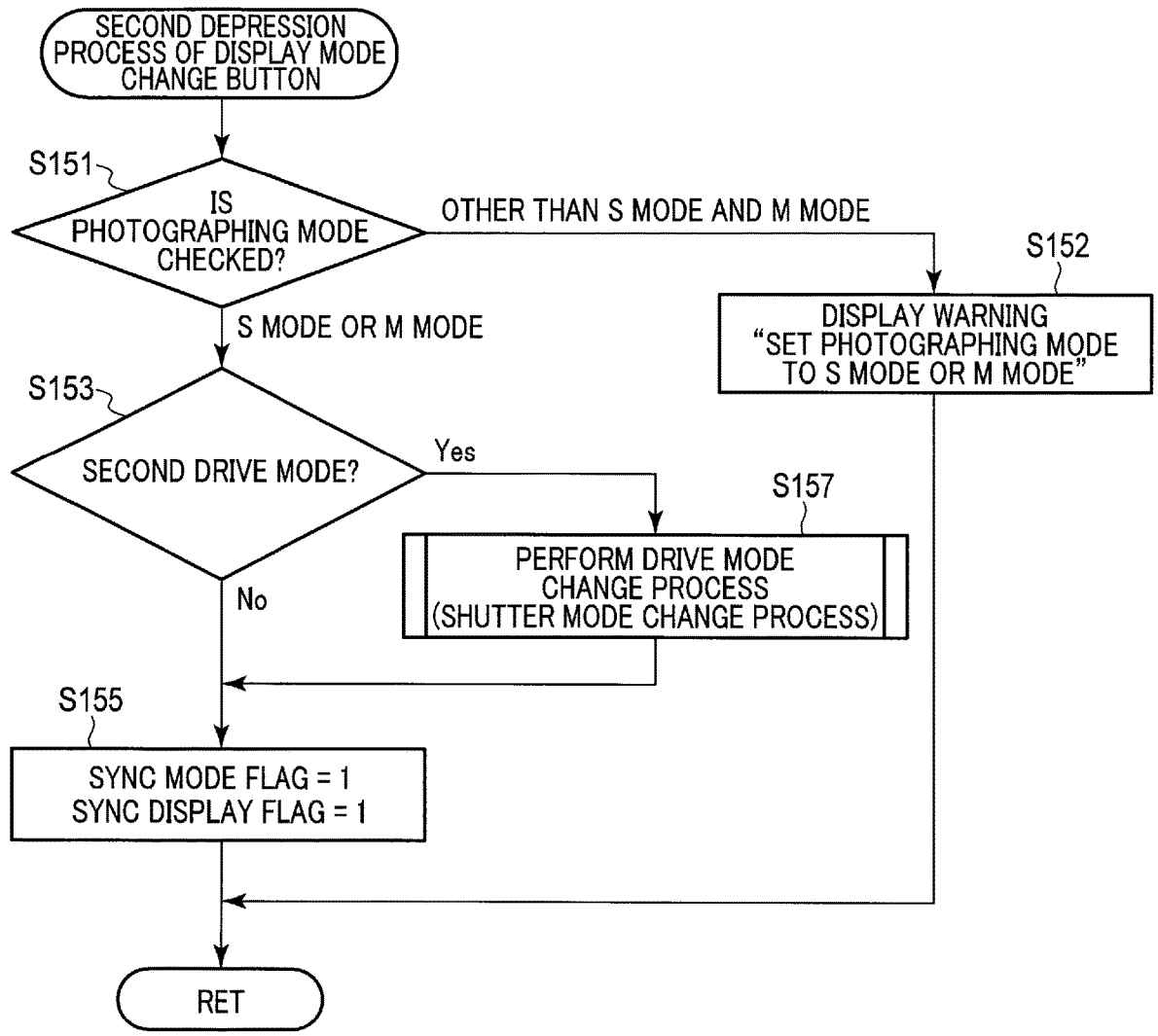

Next, the button/dial process for the normal live view display mode shown in step S74 will be described with reference to FIG. 4M. FIG. 4M is a flowchart showing the operation of the camera system 1 for the button/dial process for the normal live view display mode.

In step S141, the system controller 225 processes various button operations other than the display mode change button 325. The process proceeds to step S142. In step S142, the system controller 225 determines whether the display mode change button 325 is depressed by the user. If it is determined in step S142 that the display mode change button 325 is depressed, the process proceeds to step S143. In step S143, the system controller 225 performs the second depression process of the display mode change button 325 to be described later. Then, the process proceeds to step S7. If it is determined in step S143 that the display mode change button 325 is not depressed, the process proceeds to step S7.

Next, the second depression process of the display mode change button 325 shown in step S143 will be described with reference to FIG. 4N. FIG. 4N is a flowchart showing the operation of the camera system 1 for the second depression process of the display mode change button 325.

In step S151, the system controller 225 determines whether the photographing mode is a photographing mode (for example, P mode and the like) other than the S mode and the M mode of a still image or a movie. If it is determined that the photographing mode is the photographing mode other than the S mode and the M mode, the process proceeds to step S152. In step S152, the display 221 displays a warning that the photographing mode should be set to the S mode or the M mode. The first live view display mode is a display mode which allows the user to determine the shutter speed at which the lateral stripes do not occur at the time of the photographing under the condition that the user visually recognizes the lateral stripes on the image caused by the flicker. Therefore, prior to performing the changing from the normal live view display mode to the first live view display mode, the system controller 225 controls the driving of the photographing mode so that the camera system 1 is operated only in the S mode or the M mode which is the photographing mode which allows the user to determine the shutter speed. This control can provide the effect that the capacity of the memory can be reduced. In addition, the reduction in the capacity of the memory having large power consumption can provide the effect of reducing the size and weight of the camera system 1 and the heat generation amount.

If it is determined in step S151 that the photographing mode is the S mode or the M mode of the still image or the movie, the process proceeds to step S153. The system controller 225 is configured to set a drive move in either a first drive mode using an electronic rolling shutter or a second drive mode using the shutter (for example, the mechanical shutter or the electronic front curtain shutter) other than the electronic rolling shutter. For example, the first drive mode has a silent shutter mode operated by the electronic rolling shutter. The second drive mode has a mechanical single shot mode. In step S153, the system controller 225 determines whether the drive mode is set to the second drive mode.

If it is determined in step S153 that the drive mode is set to the second drive mode, the process proceeds to step S154. In step S154, the system controller 225 recommends the first drive mode. For this recommendation, for example, the display 221 displays a message that the drive mode should be set in the first drive mode (silent shutter mode) or the drive mode should be changed to the first drive mode. The first live view display mode is a display mode which allows the user to determine the shutter speed at which the lateral stripes do not occur at the time of the photographing under the condition that the user visually recognizes the lateral stripes on the image caused by the flicker. The strict shutter control for flicker is performed using the electronic rolling shutter. Therefore, prior to performing the changing from the normal live view display mode to the first live view display mode, the system controller 225 recommends the change to the drive mode using the electronic rolling shutter. This can provide the effect of reducing the capacity of the program memory, the size and weight of the camera system 1, and the heat generation amount.

If it is determined in step S153 that the drive mode is set to the first drive mode, the process proceeds to step S155. In step S155, the system controller 225 sets the SYNC mode flag to 1 and sets the SYNC display flag to 1. Then, the process proceeds to step S7.

When the drive mode and the shutter mode can be individually set, in step S153, the system controller 225 may determine whether the shutter mode is set to the electronic rolling shutter or is set to the shutter mode other than the electronic rolling shutter.

Next, a first modification of the second depression process of the display mode change button 325 will be described with reference to FIG. 4O. FIG. 4O is a flowchart showing the operation of the camera system 1 for the first modification of the second depression process.

Although the recommendation is performed in step S154, the embodiment is not limited thereto, and as shown in the modification, the system controller 225 may be reset to the first drive mode. In other words, the system controller 225 may limit the drive mode to the first drive mode using the electronic rolling shutter.

In this modification, step S154 is changed to step S157. In step S157, the system controller 225 performs the drive mode change process (shutter mode change process) to be described later. In step S157, prior to performing the changing from the normal live view display mode to the first live view display mode, the system controller 225 improves the operability by automatically changing the drive mode to the first drive mode. This change can provide the effect of reducing the capacity of the memory, the size and weight of the camera system 1, and the heat generation amount.

Next, the drive mode change process shown in step S157 will be described with reference to FIG. 4P.

Figure 4P:
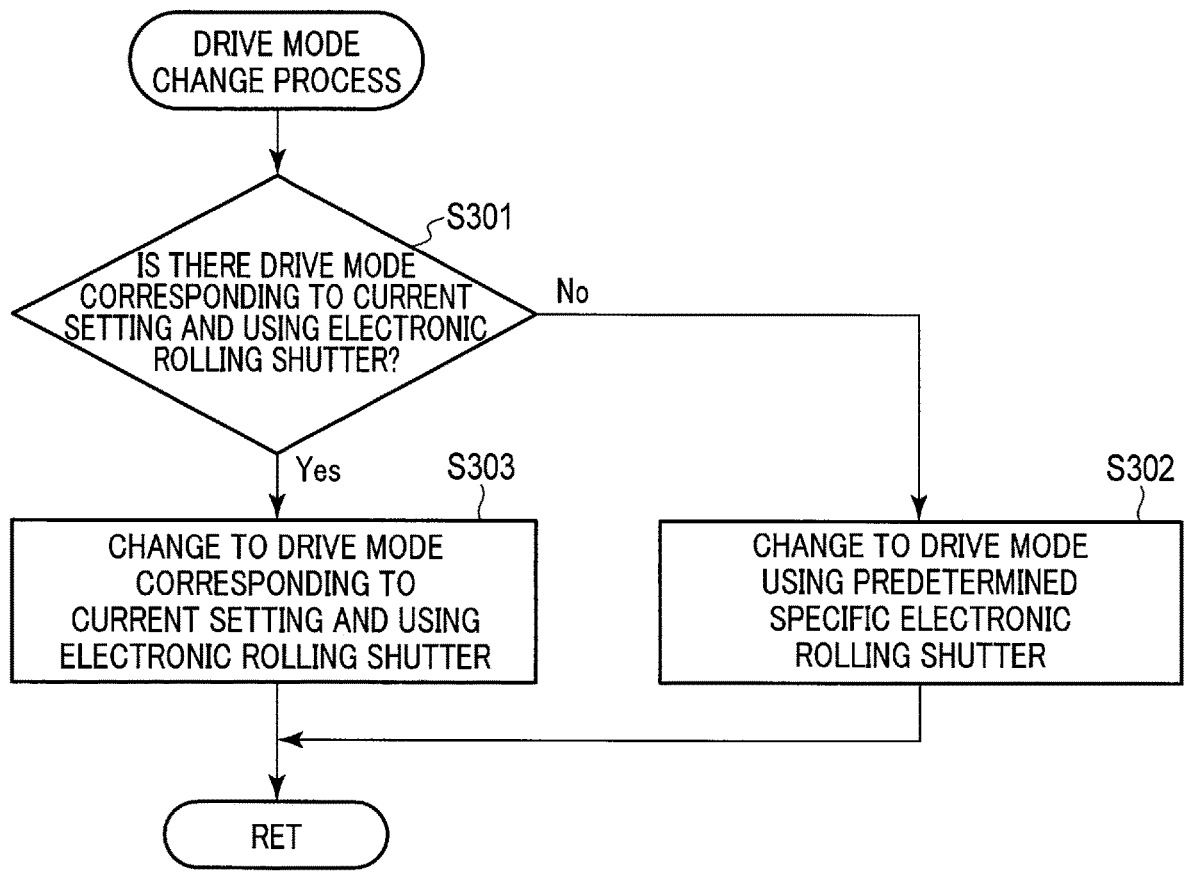
FIG. 4P is a flowchart showing the operation of the camera system for drive mode change process.

FIG. 4P is a flowchart showing the operation of the camera system 1 for the drive mode change process. In the drive mode change process, when the drive mode is set to the second drive mode, the system controller 225 prohibits the setting to the second drive mode.

In step S301, the system controller 225 determines whether there is the drive mode corresponding to the current setting and using the electronic rolling shutter. For example, when the current setting is the single shot mode and the single shot mode includes a mode (for example, a silent single shot mode) using the electronic rolling shutter, it is determined that there is the drive mode corresponding to the current setting and using the electronic rolling shutter.

If it is determined in step S301 that there is no drive mode corresponding to the current setting and using the electronic rolling shutter, the process proceeds to step S302. In step S302, the system controller 225 is changed to the drive mode which uses a predetermined specific electronic rolling shutter (for example, silent single shot mode).

If it is determined in step S301 that there is the drive mode corresponding to the current setting and using the electronic rolling shutter, the process proceeds to step S303. In step S303, the system controller 225 changes the drive mode from the drive mode of the current setting to the drive mode corresponding to the current setting and using the electronic rolling shutter. Thereafter, the process proceeds to step S155. In the above embodiment, although the system controller 225 changes the drive mode to change the shutter mode to the electronic rolling shutter, the system controller 225 may be configured to directly change the shutter mode.

Next, a second modification of the second depression process of the display mode change button 325 will be described with reference to FIG. 4Q. FIG. 4Q is a flowchart showing the operation of the camera system 1 for the second modification of the second depression process.

The second modification is a modification in which the photographing mode is automatically changed. The second modification can be applied to the shutter mode (for example, a mechanical shutter or an electronic front curtain shutter) other than the electronic rolling shutter in the drive mode. The operability can be improved by automatically changing the photographing mode.

In step S161, the system controller 225 determines whether the photographing mode is a photographing mode other than the S mode or the M mode. If it is determined that the photographing mode is the photographing mode other than the S mode and the M mode, the process proceeds to step S162. In step S162, the system controller 225 performs the photographing mode change process to be described later. Thereafter, the process proceeds to step S164.

If it is determined in step S161 that the photographing mode is the S mode or the M mode, the process proceeds to step S163. In step S163, the system controller 225 determines whether the drive mode is set to the second drive mode. If it is determined in step S163 that the drive mode is set to the second drive mode, the process proceeds to step S164.

If it is determined in step S163 that the drive mode is not set to the second drive mode, the process proceeds to step S164. Here, there is no limitation on the drive mode (shutter mode), and when the mechanical shutter or the electronic front curtain shutter is used, the shutter is driven with the fine shutter speed series. This makes it possible to prevent the occurrence of the lateral stripes. At this time, the system controller 225 controls the timing of releasing the front curtain and the rear curtain while taking into account the drive delay of the actuator in order to make the exposure time according to the slit width produced by the mechanical shutter match the adjustment value of the shutter speed. However, unlike the electronic rolling shutter, the mechanical shutter includes lateral stripes of about ⅙EV at the time of the exposure by fluctuating the mechanical shutter. This lateral stripes is likely to be emphasized by depending on the flickering period of the LED. In order to alleviate this emphasis, it is desirable to drive the mechanical shutter at an integral multiple of the set shutter speed. This operation may be performed by the user himself on the second live view, or in the second live view, it may be configured to display a value twice the shutter speed of the first live view.

In step S164, the system controller 225 sets the SYNC mode flag to 1 and sets the SYNC display flag to 1. Then, the process proceeds to step S7.

Next, the photographing mode change process shown in step S162 will be described with reference to FIG. 4R. FIG. 4R is a flowchart showing the operation of the camera system 1 for the photographing mode change process.

In step S171, the system controller 225 determines which of a P mode or an A mode the photographing mode is. If it is determined that the photographing mode is the P mode, the process proceeds to step S172. The system controller 225 changes an exposure control program to the P mode in which the shutter speed is fixed. The process proceeds to step S164.

If it is determined in step S171 that the photographing mode is the A mode, the process proceeds to step S173. The system controller 225 changes the exposure control program to the M mode. The process proceeds to step S164.

Next, the first modification of the photographing mode change process shown in step S162 will be described with reference to FIG. 4S. FIG. 4S is a flowchart showing the operation of the camera system 1 for the first modification of the photographing mode change process.

In step S171, the system controller 225 determines which of the P mode or the A mode the photographing mode is. If it is determined that the photographing mode is the P mode, the process proceeds to step S174. The system controller 225 changes the exposure control program to the S mode. The process proceeds to step S164.

If it is determined in step S171 that the photographing mode is the A mode, the process proceeds to step S175. The system controller 225 changes the exposure control program to the M mode. The process proceeds to step S164.

Figure 4T:
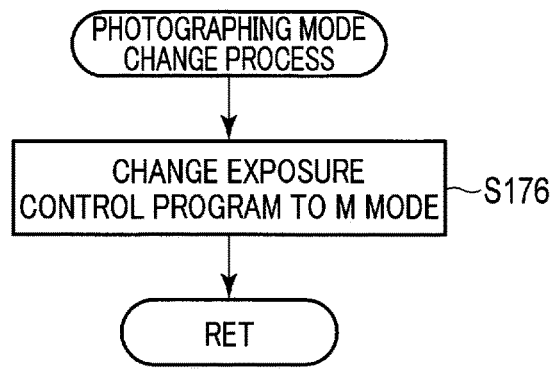
FIG. 4T is a flowchart showing the operation of the camera system for the second modification of the photographing mode change process.

Next, the second modification of the photographing mode change process shown in step S162 will be described with reference to FIG. 4T. FIG. 4T is a flowchart showing the operation of the camera system 1 for the second modification of the photographing mode change process.

In step S176, the system controller 225 changes the exposure control program to the M mode. The process proceeds to step S164.

Figure 4U:
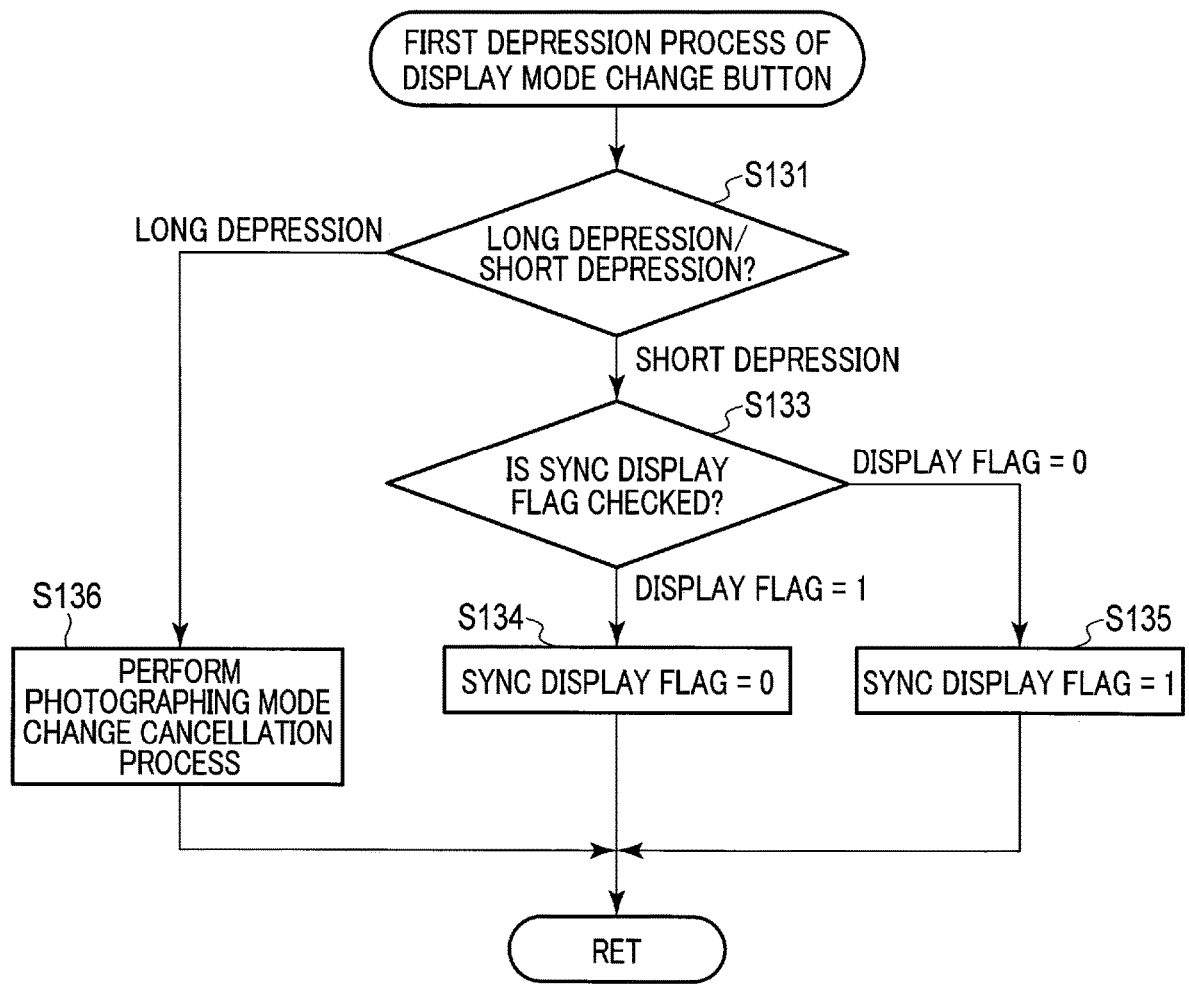
FIG. 4U is a flowchart showing the operation of the camera system for the first modification of first depression process of the display mode change button.

Next, the first modification of the first depression process of the display mode change button 325 shown in step S127 will be described with reference to FIG. 4U. FIG. 4U is a flowchart showing the operation of the camera system 1 for the first modification of first depression process of the display mode change button 325.

Here, step S132 is changed to step S136. In step S136, the system controller 225 performs photographing mode change cancellation process. Specifically, the system controller 225 sets the SYNC mode flag to 0 and sets the SYNC display flag to 0. The process proceeds to step S7.

In the first embodiment, the first live view display mode using the still image imaging sequence and the second live view display mode using the imaging sequence different from the still image imaging sequence are changed. The first live view display mode has the enlarged live view display mode in which a part of an image is cut out to be displayed at the enlargement magnification substantially equal to or more than the pixel equal magnification, and the normal magnification live view display mode displaying an image with a magnification lower than the enlargement magnification. The fine lateral stripes are likely to be visually recognized in the enlarged live view image 353b of the enlarged live view display mode, and the user can easily set a high shutter speed at which the lateral stripes do not occur before the photographing. In the first live view display mode using the still image imaging sequence, since all pixels are read out, there is an upper limit on the frame rate, the refresh rate is lowered, and the display delay is likely to occur. In the first embodiment, the first live view display mode is changed to the second live view display mode by the elapse of the predetermined time of the non-operation time. In the second live view display mode, the followability and visibility of the moving subject is prioritized, and the imaging element 206 is driven in the imaging sequence in which the refresh time is shortened at a high frame rate and a short display latency rather than the still image imaging sequence. As a result, the user visually recognizes the second live view image 355 in the second live view display mode, and can photograph a still image without the lateral stripes disturbing framing and the display delay.

As described above, according to the first embodiment, it is possible to provide an imaging device which makes it easy to visually recognize flicker caused by the LED light source or the like before the photographing and precisely set a shutter speed at which no flicker occurs.

In addition, if the first live view image 353 continues to be displayed, the temperature of the imaging element 206 continues to rise and the S/N ratio of the image signal output from the imaging element 206 deteriorates. Therefore, it is difficult to perform the ideal low-noise photographing. In addition, when the temperature further rises, the operation of the imaging element 206 is stopped in some cases. The operation of the imaging element 206 is stopped, such that the photographing opportunity may be lost. In the first embodiment, since the display mode is changed to the second live view display mode when the non-operation time passes the predetermined time in the first live view display mode, the temperature of the imaging element 206 can be suppressed from rising, and the loss of the shutter opportunity can be prevented beforehand.

Second Embodiment

Figure 5:
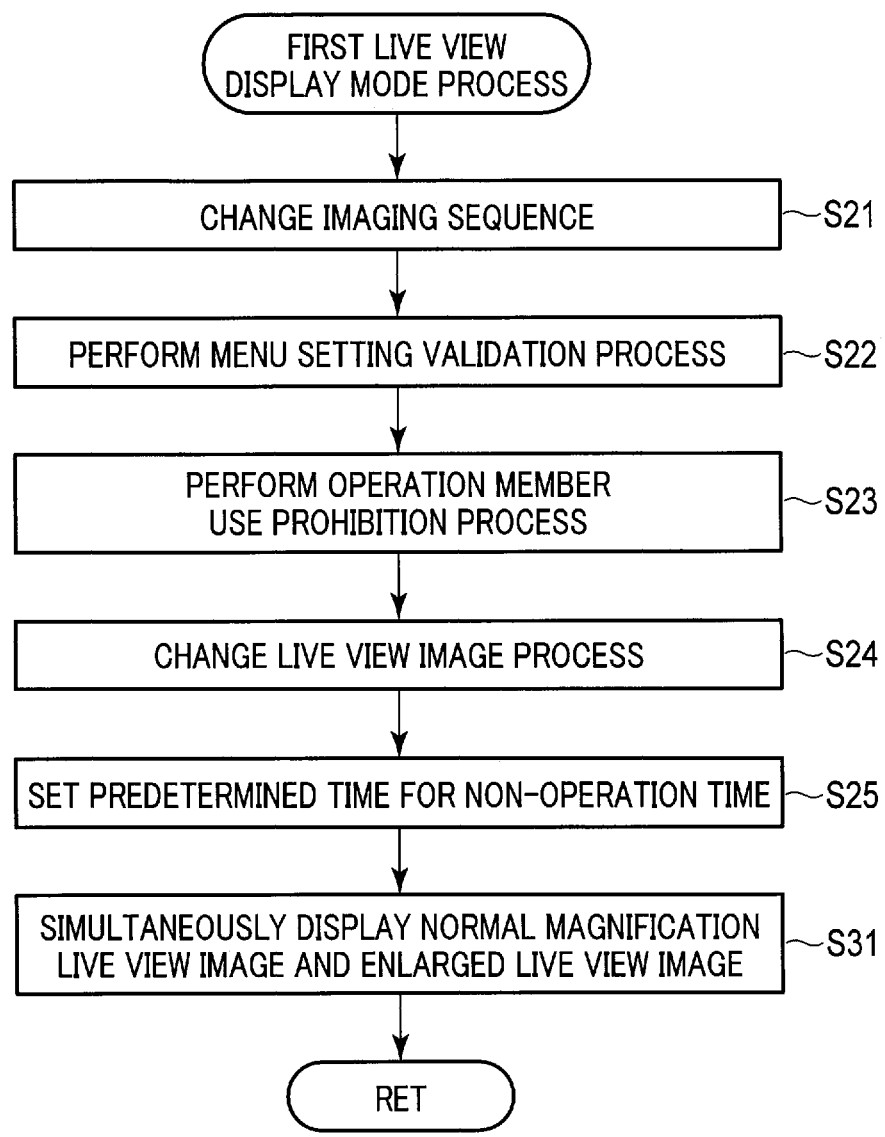
FIG. 5 is a flowchart showing an operation of a camera system for a first live view display mode process according to a second embodiment.

A second embodiment will be described with reference to FIGS. 5, 6, and 7. In the second embodiment, those different from those described in the first embodiment will be mainly described.

First live view display mode process of the second embodiment will be described with reference to FIG. 5. FIG. 5 is a flowchart showing an operation of a camera system 1 for the first live view display mode process. Similar to the first embodiment, although processes in steps S21 to S25 are performed in this order, the order of the performance is not particularly limited.

After step S25, the process proceeds to step S31. In step S31, the system controller 225 controls a display 221 so that the display 221 simultaneously displays a normal magnification live view image 353a and an enlarged live view image 353b. As shown in FIGS. 6 and 7, the normal magnification live view image 353a is displayed on the entire display 221, and the enlarged live view image 353b is displayed to be superimposed on the normal magnification live view image 353a. The normal magnification live view image 353a has a size smaller than the enlarged live view image 353b. For example, the normal magnification live view image 353a is arranged at a corner of the rectangular enlarged live view image 353b.

Figure 6:
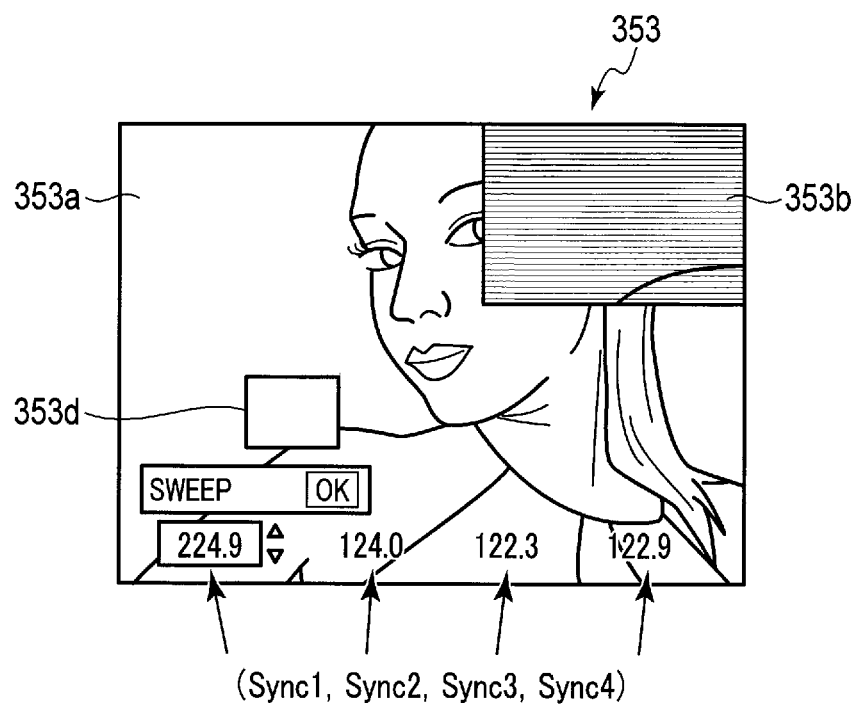
FIG. 6 is a diagram showing an example of a display which simultaneously displays a normal magnification live view display and an enlargement live view display.
Figure 7:
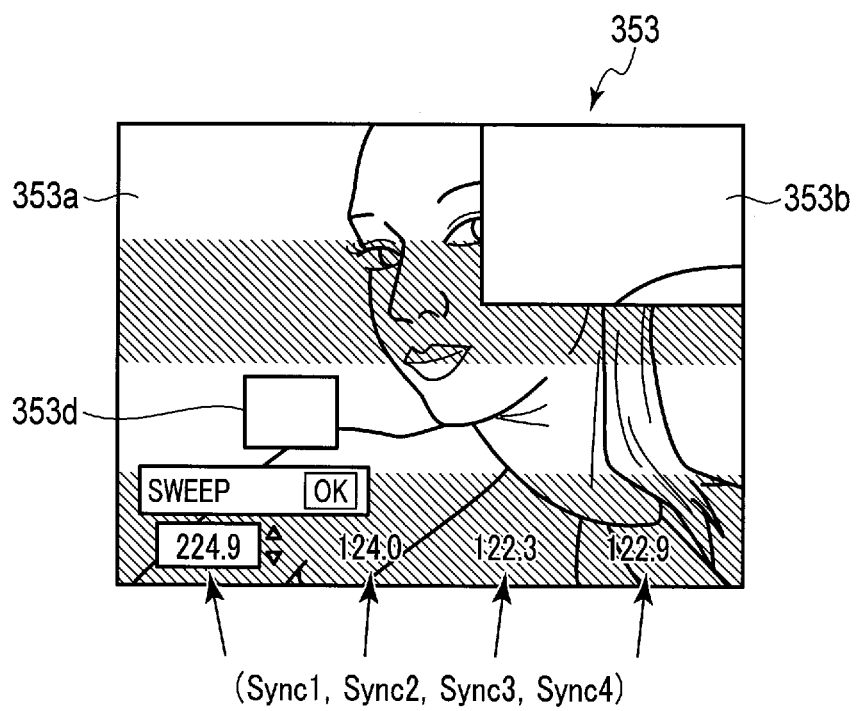
FIG. 7 is a diagram showing an example of the display which simultaneously displays the normal magnification live view display and the enlargement live view display.

As shown in FIG. 6, lateral stripes having a small width completely disappear at the time of being displayed on the display 221 having a smaller number of display pixels than the number of pixels of data obtained from an imaging element 206. For this reason, fine lateral stripes having a small width cannot be visually recognized unless they are in the enlarged live view image 353b which is conscious of a dot-by-dot pixel equal magnification. This case is the most problematic at actual the photographing situation. As shown in FIG. 6, a user does not notice the fine lateral stripes in the normal magnification live view image 353a, but since the lateral stripes are enlarged up to the dot by dot when viewing the enlarged live view image 353b, the lateral stripes for each pixel line can be visually recognized.

When a shutter speed is slightly longer or shorter than an LED flickering cycle, wide lateral stripes are easily displayed for each of a plurality of pixel lines. In the enlarged live view image 353b shown in FIG. 7, there are cases in which the enlargement magnification is too large and the lateral stripes having a wide width are not recognized as a stripe. If the lateral stripes displayed in the enlarged live view image 353b are flowing temporally, a user feels that the enlarged live view image 353b is gently flickering, such that the user may notice the lateral stripes due to this flickering. However, when the flickering does not occur or the flickering is very slowly, even if the enlarged live view image 353b is visually recognized, the lateral stripes are not noticed. Therefore, as shown in FIG. 7, the lateral stripes having a wide width or the lateral stripes flowing on a screen are likely to be visually recognized in the normal magnification live view image 353a. As described above, in order to reliably visually recognize the lateral stripes, at least the enlarged live view image 353b using a large magnification which is conscious of dot by dot and the normal magnification live view image 353a using a small magnification which complements a large magnification are used, and it is preferably for the user to simultaneously confirm the live view images 353a and 353b using two kinds of magnifications.

Since the normal magnification live view image 353a and the enlarged live view image 353b can be confirmed simultaneously, it is possible to reliably and quickly set the shutter speed without the lateral stripes.

Third Embodiment

Hereinafter, a third embodiment will be described with reference to FIG. 8. In the third embodiment, those different from those described in the first embodiment will be mainly described.

In the third embodiment, a storage and warning of a shutter speed associated with each Sync number when there are a plurality of photographing modes will be described.

A value of a shutter speed which can be set in a camera system 1 are displayed up to a first decimal place on a display 221. However, the actual value of the shutter speed can be set to the first decimal place or less. Since the possible values of the shutter speed differ for each imaging sequence of the imaging element 206, the shutter speed can not strictly be controlled unless the imaging sequence is the same. The imaging sequence differs depending on a frame rate, reading of all pixels, setting of a reading mode of an imaging element 206 such as addition and reading of pixels, and setting of a reading area of the imaging element 206 such as whole reading and partial reading. Therefore, the camera system 1 uses various photographing modes.

In the case of a still image, there are two kinds of imaging sequences depending on the presence/absence of the "reading mode of all the pixels" and a "digital teleconverter".

In the case of a movie, there are six kinds of "frame rate" of 60 p: 59.94 fps, 50 p: 50.00 fps, 30 p: 29.97 fps, 25 p: 25.00 fps, 24 p: 23.98 fps, and 24.00 fps. There are 4 kinds of "image size" of 4K, C4K, FHD, and HD, and there are two kinds of "movie teleconverter". As a result, there are 48 kinds (6×4×2) of imaging sequences.

Strictly speaking, in order to avoid lateral stripes, photographing should be performed by confirming a shutter speed without the lateral stripes in the imaging sequence of the actual photographing number after a full depression in a live view at the time of photographing standby or after depressing a movie button 335. However, if four stored values of Sync 1, Sync 2, Sync 3, and Sync 4 are separately held and used in 48 kinds of imaging sequences described above, 192 (48×4) parameters are handled. This is not practical from the viewpoint of operability of a user.

Therefore, the imaging device according to the embodiment stores the values of the shutter speed up to a μsec order. Then, when the imaging sequence is changed and a mismatch in the μsec order occurs with respect to the shutter speed, the imaging device is configured to temporarily set a setting value closest to the shutter speed among the values of the shutter speed, which can be set in the set imaging sequence, to the shutter speed.

Here, setting error process for the shutter speed will be described with reference to FIG. 8. FIG. 8 is a flowchart showing an operation of the camera system 1 for the setting error process for the shutter speed.

In step S181, the system controller 225 determines whether the shutter speed matches the settable value of the current imaging sequence. If the shutter speed is not the settable value of the current imaging sequence, the process proceeds to step S182. In step S182, the system controller 225 temporarily sets the setting value closest to the shutter speed to the shutter speed. In addition, the system controller 225 controls the display 221 so that the display 221 displays a warning that a mismatch (setting error) with the shutter speed has occurred. For example, the warning may indicate an icon indicating the mismatch, or may indicate the shutter speed with color such as red.

By incorporating such setting error process, the user can operate the camera system 1 without confusion, taking into consideration only eight parameters in which four parameters (Sync 1, Sync 2, Sync 3, and Sync 4) of a movie are combined with four parameters (Sync 1, Sync 2, Sync 3, and Sync 4) of a still image.

In addition, if the user adjusts the Sync shutter speed in his/her most important photographing mode and stores the adjusted shutter speed, the photographing mode can be set to the strict shutter speed. This can ensure both the convenience of operation and the strictness of removal of lateral stripes.

Fourth Embodiment

Hereinafter, a fourth embodiment will be described with reference to FIGS. 9, 10A, 10B, and 10C. In the fourth embodiment, those different from those described in the first embodiment will be mainly described.

Figure 9:
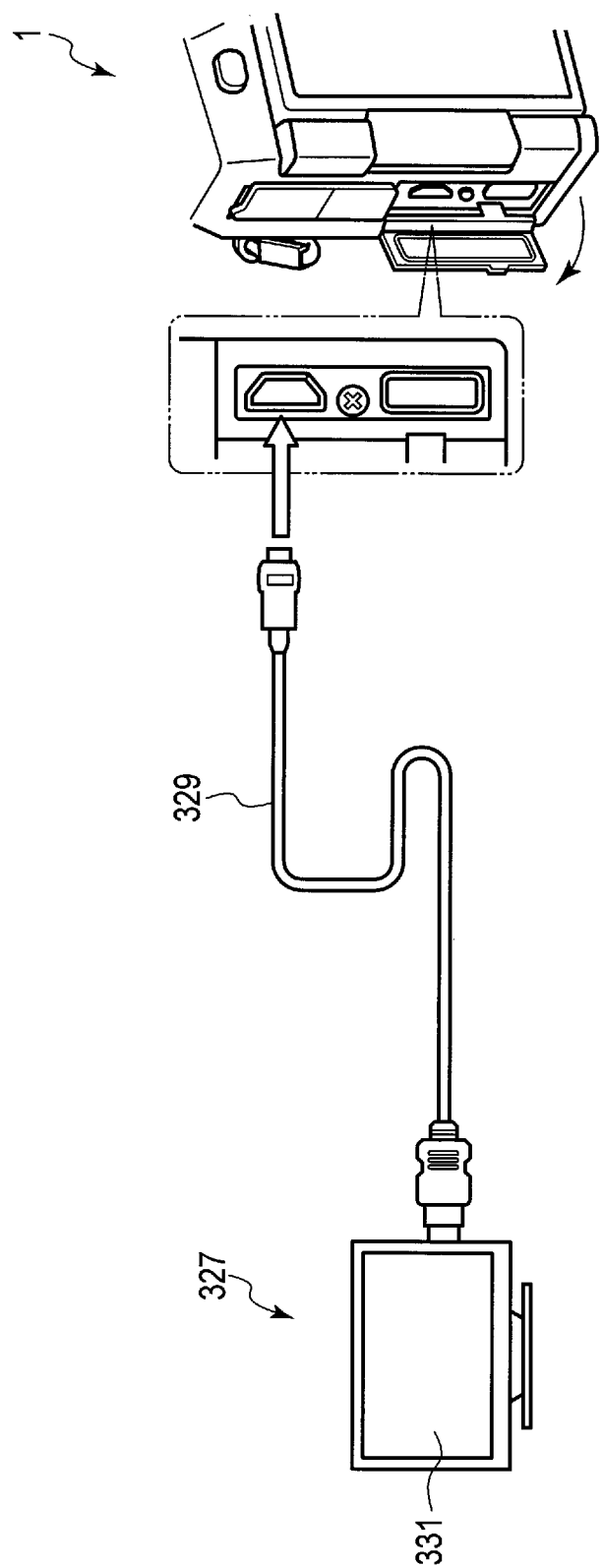
FIG. 9 is a diagram showing an external device to which a camera system as an example of an imaging device according to a fourth embodiment is connected.

FIG. 9 is a diagram showing a camera system 1 as an example of an imaging device according to the fourth embodiment and an external device 327 to which the camera system 1 is connected by wire, such as a cable 329 of an HDMI type. A movie photographed by the camera system 1 is output from the camera system 1 to the external device 327, and is recorded on a recording device (for example, a hard disk) (not shown) provided in the external device 327. The output or recorded movie can be displayed on an external display 331 (for example, a monitor) of the external device 327.

In a first live view display mode of the fourth embodiment, movies captured in an movie imaging sequence for reading all pixels of an image captured with a value of a shutter speed of a second shutter speed series are sequentially displayed on the display 221. In addition, in the second live view display mode, movies captured in the movie imaging sequence and subjected to image process set in a movie picture mode are sequentially displayed on the display 221. The display mode change button 325 is a button for changing a live view display mode of the camera body 200 to one of a normal live view display mode, a first live view display mode, and a second live view display mode.

The system controller 225 sets an output mode of the live view output from the camera system 1 to any of a monitor mode or a recording mode. In addition, the system controller 225 outputs a movie to the external device 327 in the set output mode.

When the monitor mode is set, the system controller 225 outputs the same movie as the movie displayed on the display 221 and the information on the camera system 1 to the external device 327 according to the changed live view display mode. At this time, the display 221 displays only the movie and does not display the information on the camera system 1.

When the recording mode is set, the system controller 225 outputs a first live view image 353 in the first live view display mode or a second live view image 355 in the second live view display mode to the display 221. In addition, the system controller 225 outputs the second live view image 355, which is an equal-magnification display without information display in the second live view display mode, to the external device 327. That is, the system controller 225 outputs the movie to the external device 327. At this time, the display 221 of the camera system 1 displays only the information on the camera system 1 without displaying the movie.

Here, the process of the camera system 1 and the external device 327 in the movie photographing will be described with reference to FIG. 10A. FIG. 10A is a flowchart showing operations of the camera system 1 and the external device 327 in the movie photographing.

In step S191, the system controller 225 performs the display process to be described later on the display 221, and the process proceeds to step S192. In step S192, the external device 327 performs the display process on the external display 331, and the process proceeds to step S6. In step S6, the system controller 225 performs button/dial process described above. Thereafter, the process proceeds to step S193. In step S193, the system controller 225 determines whether a movie button 335 (see FIG. 2) for photographing a movie is depressed. If it is determined that the movie button 335 is depressed, the process proceeds to step S194. In step S194, the system controller 225 photographs the movie with the set values of the shutter speed, and the process returns to step S191. If it is determined in step S193 that the movie button 335 is not depressed, the process proceeds to step S191.

Figure 10B:
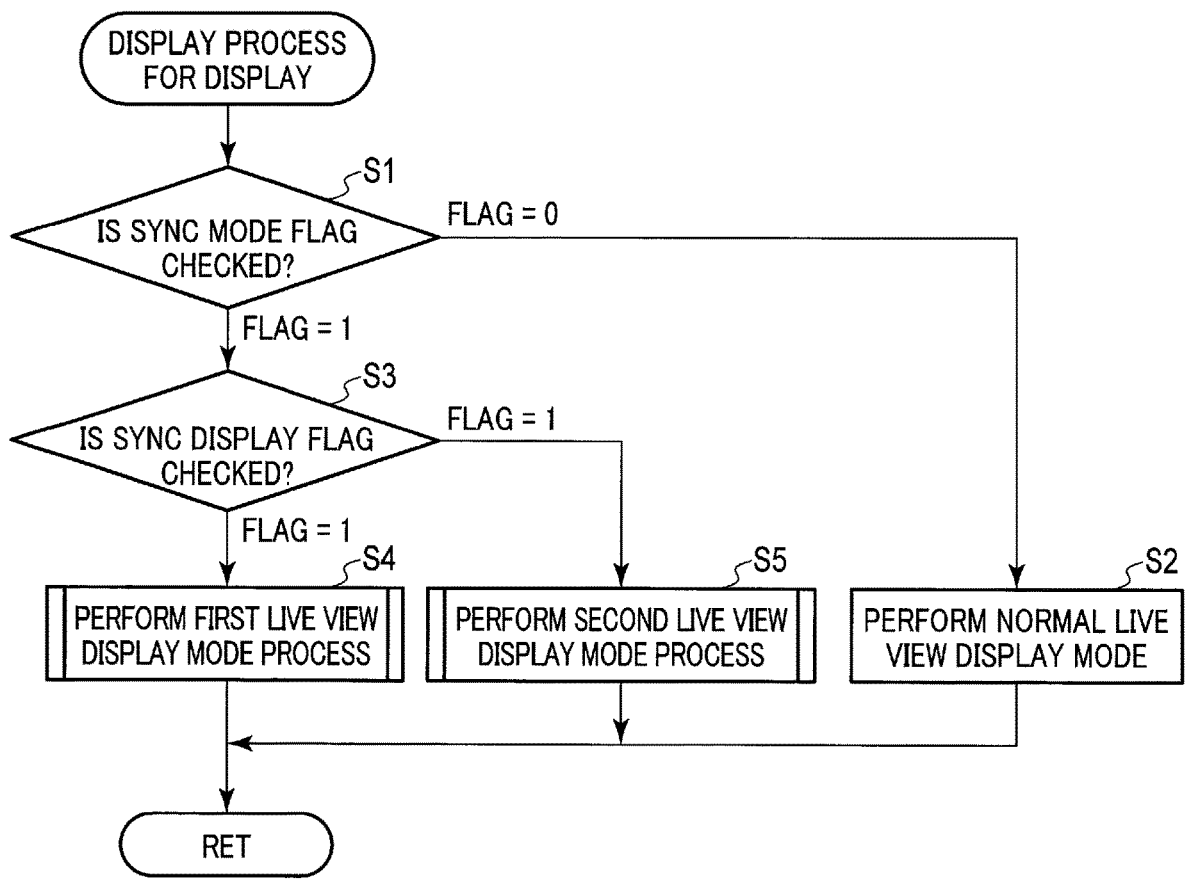
FIG. 10B is a flowchart showing an operation of display process on the display.

Here, the display process on the display 221 in step S191 will be described with reference to FIG. 10B. FIG. 10B is a flowchart showing the operation of the display process on the display 221.

In the display process on the display 221 shown in FIG. 10B, the same processes as the steps S1, S2, S3, S4 and S5 shown in FIG. 4A are performed. After the processes of steps S2, S4, and S5, the process proceeds to step S192. In addition, the information such as whether the SYNC mode flag is 1 or 0 and the SYNC display flag is 1 or 0 is input to the external device 327.

Figure 10C:
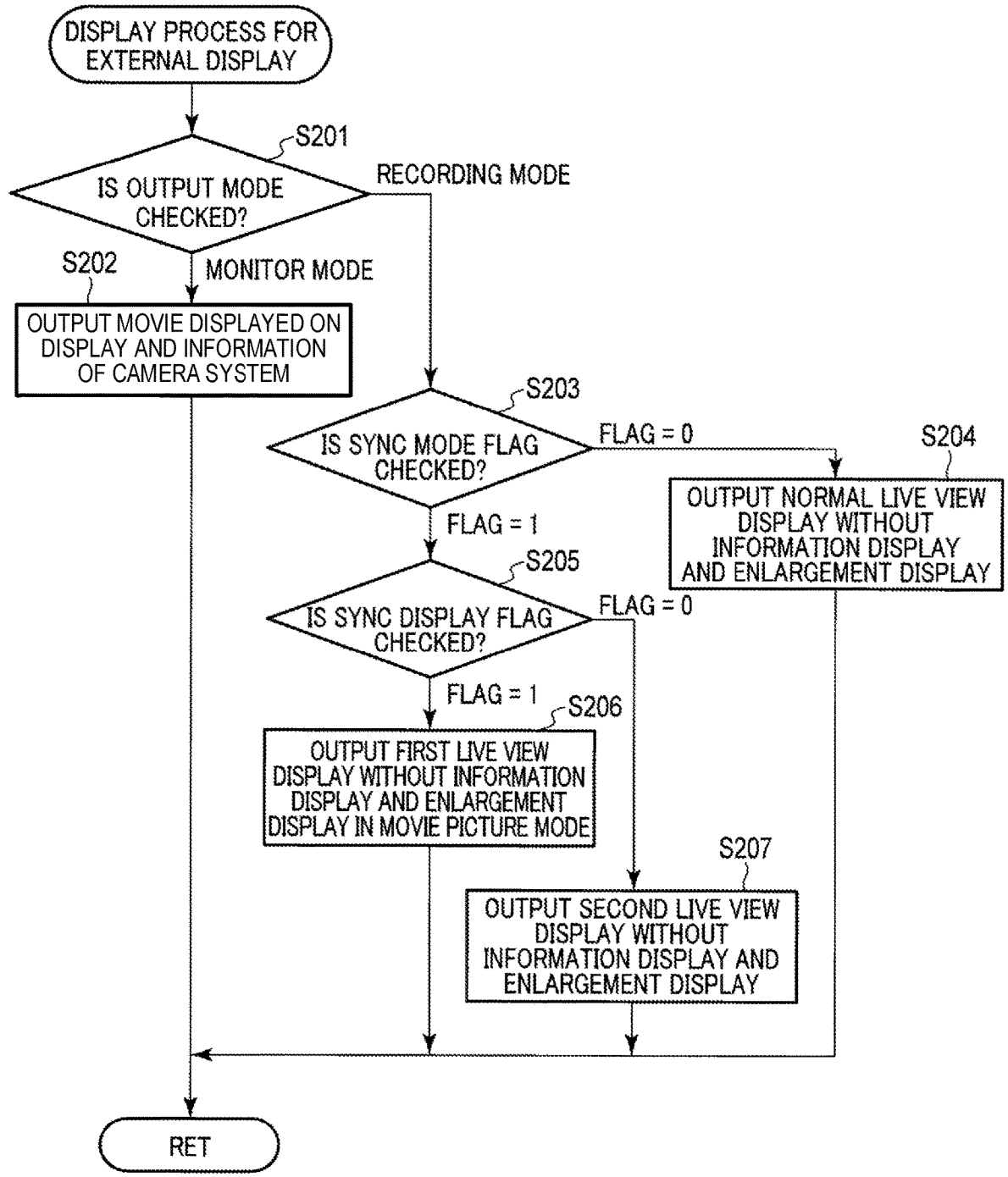
FIG. 10C is a flowchart showing an operation of display process on an external display.

Next, the display process on the external display 331 in step S192 will be described with reference to FIG. 10C. FIG. 10C is a flowchart showing an operation of the display process on the external display 331.

In step S201, the system controller 225 determines which of the monitor mode or the recording mode the output mode is. Here, the monitor mode is a mode aimed at handling the external display 331 of the external device 327 in the same manner as the display 221 or a finder provided on a back surface of the camera body 200. Therefore, it is desirable to output the photographing information including the same movie as the movie displayed on the display 221 and the information on the camera system 1. The recording mode is a mode aimed at recording only the image input to the external device 327. Therefore, it is not desirable to display the photographing information. In addition, in the recording mode, special image process is also undesirable, and it is desirable to perform image process in a picture mode for recording. If it is determined that the output mode is the monitor mode, the process proceeds to step S202. In step S202, the system controller 225 outputs the instruction, the movie, and the information to the external device 327 to control the external display 331 so that the external display 331 displays the same movie as the movie displayed on the display 221 and the information on the camera system 1. For example, if the display 221 performs the first live view display, the external display 331 performs the first live view display. Thereafter, the process proceeds to step S6.

If it is determined in step S201 that the output mode is the recording mode, the process proceeds to step S203.

In step S203, the system controller 225 checks the SYNC mode flag. If it is determined in step S203 that the SYNC mode flag is 0, the process proceeds to step S204. In step S204, the system controller 225 outputs an instruction to the external device 327 to control the external display 331 so that the information on the camera system 1 is not displayed, the enlargement display is not performed, and the external display 331 performs the normal live view display. Then, the process proceeds to step S6.

If it is determined in step S203 that the SYNC mode flag is 1, the process proceeds to step S205. In step S205, the system controller 225 checks the SYNC display flag.

If it is determined in step S205 that the SYNC display flag is 1, the process proceeds to step S206. In step S206, the system controller 225 outputs an instruction to the external device 327 to control the external display 331 so that the external display 331 performs the first live view display. Then, the process proceeds to step S6. In the first live view display, the movie is displayed in the movie picture mode, the information on the camera system 1 is not displayed, and the enlargement display is not performed.

In addition, if it is determined in step S205 that the SYNC display flag is 0, the process proceeds to step S207. In step S207, the system controller 225 outputs an instruction to the external device 327 to control the external display 331 so that the information on the camera system 1 is not displayed, the enlargement display is not performed, and the external display 331 performs the second live view display. Then, the process proceeds to step S6.

In the fourth embodiment, in the normal live view display mode, the external display 331 can perform the normal live view display in which the information on the camera system 1 is not displayed, and the enlargement display is not performed. In the first live view display mode, in the movie picture mode, the external display 331 can perform the first live view display in which the information on the camera system 1 is not displayed, and the enlargement display is not performed. In the second live view display mode, the external display 331 can perform the second live view display in which the information on the camera system 1 is not displayed, and the enlargement display is not performed.

Fifth Embodiment

Figure 11:
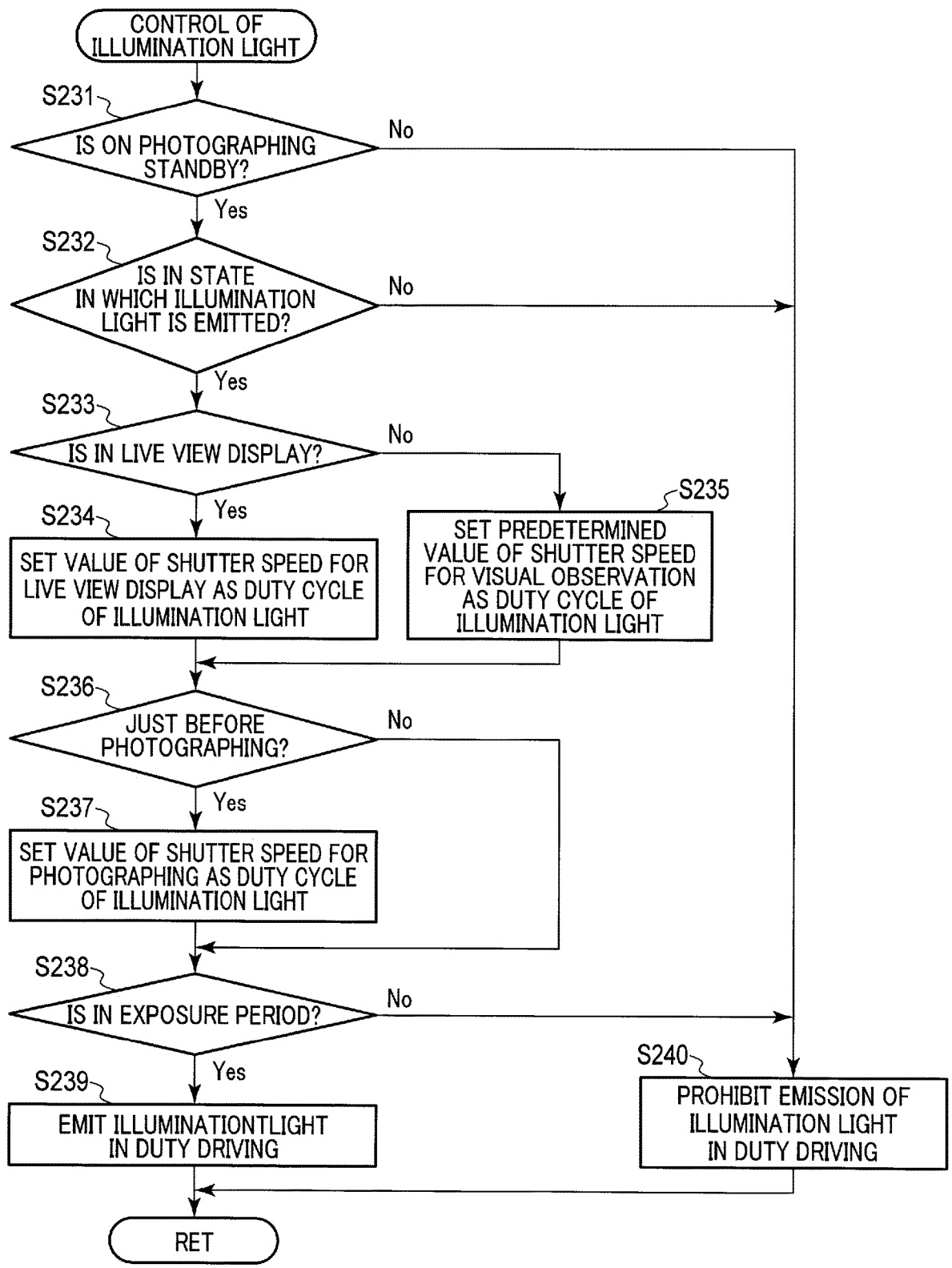
FIG. 11 is a diagram showing a fifth embodiment, and a flowchart showing an operation of controlling an emission of illumination light in a state in which a value of a shutter speed of an imaging element is set as a duty cycle of the illumination light.

Hereinafter, a fifth embodiment will be described with reference to FIG. 11. In the fifth embodiment, those different from those described in the first embodiment will be mainly described.

Generally, in driving of LED illumination, AC driving (duty driving) is performed rather than DC driving. By the AC driving, it is possible to suppress a heat generation of a lighting element, enhance the color rendering property of illumination light, extend a life of the lighting element, improve durability of a battery for the lighting element, increase a control range of a light quantity of the illumination light, and simply a control circuit for the lighting element. These effects are important for, for example, a professional photographer photographing a still image and a professional photographer photographing a movie. In addition, the importance of these effects is further increased, for example, in devices having an extremely limited size such as a capsule endoscope.

In the case in which the duty driving is performed, the system controller 225 not only passively detects flickering of the illumination light but also detects a duty cycle of the illumination light by actively communicating with the lighting element to set a value of a shutter speed of the imaging element 206 as the duty cycle. Then, the system controller 225 controls a flash emitting unit 237 so that the illumination light is emitted in the set state.

Here, the operation of controlling the emission of illumination light in a state in which the value of the shutter speed of the imaging element 206 is set as the duty cycle of the illumination light will be described with reference to FIG. 11. FIG. 11 is a flowchart showing an operation of a camera system 1 for the same.

In step S231, the system controller 225 checks whether the camera system 1 is on a photographing standby. If it is determined that the camera system 1 is not on standby, the process proceeds to step S240. If it is determined that the camera system 1 is on standby, the process proceeds to step S232.

In step S232, the system controller 225 checks whether the illumination light is in a state of being emitted to the flash controller 233. If it is determined that the illumination light is in a state of not being emitted, the process proceeds to step S240. If it is determined that the illumination light is in a state of being emitted, the process proceeds to step S233.

In step S233, the system controller 225 checks whether a live view display is performed.

If it is determined in step S233 that the live view display is performed, the process proceeds to step S234. In step S234, the system controller 225 sets the value of the shutter speed for the live view display of the imaging element 206 as the duty cycle of the illumination light. The process proceeds to step S236.

If it is determined in step S233 that the live view display is not performed, the process proceeds to step S235. In step S235, the system controller 225 sets a predetermined value of the shutter speed of the imaging element 206 for visual observation in a finder as the duty cycle of the illumination light. The process proceeds to step S236. The predetermined value is a value recorded in a nonvolatile memory 223 in advance.

In step S236, the system controller 225 checks whether the camera system 1 is in a state just before photographing. If it is determined that the camera system 1 is not in a state just before photographing, the process proceeds to step S238, and if it is determined that the camera system 1 is just before photographing, the process proceeds to step S237.

In step S237, the system controller 225 sets the actual value of the shutter speed for the photographing as the duty cycle of the illumination light. Then, the process proceeds to step S238.

In step S238, the system controller 225 checks whether the imaging element 206 is in an exposure period. If it is determined that the imaging element 206 is in the exposure period, the process proceeds to step S239. In step S239, under the condition that the value of the shutter speed of the imaging element 206 is set as the duty cycle of the illumination light, the system controller 225 controls the flash controller 233 to emit the illumination light from the flash emitting unit 237 with the duty driving.

If it is determined in step S238 that the exposure is in an interrupted state, the process proceeds to step S240. In step S240, the system controller 225 controls the flash controller 233 to prohibit the emission of the illumination light with the duty driving.

As described above, in the fifth embodiment, the value of the shutter speed of the imaging element 206 can be set as the duty cycle of the illumination light, and the illumination light can be emitted in the set state. It should be noted that the duty cycle of the illumination light may be set according to the shutter speed of the imaging element 206.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device, comprising:
an imaging unit configured to sequentially output a digital image by capturing a subject;
a controller configured to:
change a shutter speed series, which is a series of a value of a shutter speed set for the imaging unit, to any one of a first shutter speed series and a second shutter speed series, the second shutter speed series having a value of a shutter speed having a finer step than the first shutter speed series,
control an exposure time of the imaging unit according to the first shutter speed series or the second shutter speed series, and
change a live view display mode to any of a first live view display mode and a second live view display mode, the first live view display mode being a mode sequentially displaying the digital image output according to a still image imaging sequence reading all pixels of an image captured with a value of a shutter speed of the second shutter speed series and the second live view display mode being a mode sequentially displaying the digital image output according to an imaging sequence performing addition or thinning-out reading of pixels of the captured image; and
a display configured to display the digital image in the changed live view display mode,
wherein the first live view display mode has at least an enlarged live view display mode and a normal magnification live view mode, the enlarged live view display mode is a mode in which a part of the digital image is cut out to be displayed at an enlargement magnification substantially equal to or more than a pixel equal magnification, and the normal live view display mode is a mode in which a display is performed at a lower magnification than the enlargement magnification.

2. The imaging device according to claim 1, wherein the controller sequentially changes the enlarged live view display mode and the normal magnification live view display mode in the first live view display mode.

3. The imaging device according to claim 1, wherein the display simultaneously displays an enlarged live view display which is the digital image displayed in the enlarged live view display mode and a normal magnification live view display which is the digital image displayed in the normal magnification live view display mode.

4. The imaging device according to claim 1, wherein the controller changes a drive mode of the imaging unit to any of a first drive mode and a second drive mode, the first drive mode is a mode which uses an electronic rolling shutter in the imaging of the imaging unit, and the second drive mode is a mode which uses a shutter other than the electronic rolling shutter in the photographing of the imaging unit, and
the controller recommends the first drive mode to a user or changes the drive mode to the first drive mode, when the shutter speed series is changed to the second shutter speed series.

5. The imaging device according to claim 1, wherein the controller changes a drive mode of the imaging unit to any of a first drive mode and a second drive mode, the first drive mode is a mode which uses an electronic rolling shutter in the imaging of the imaging unit, and the second drive mode is a mode which uses a shutter other than the electronic rolling shutter in the imaging of the imaging unit, and
the controller prohibits the drive mode from being changed to the second drive mode, when the shutter speed series is changed to the second shutter speed series.

6. The imaging device according to claim 1, wherein the controller changes the shutter speed to a fine step or a coarse step in the first live view display mode.

7. The imaging device according to claim 1, wherein the controller changes a shutter speed while sweeping the shutter speed in the first live view display mode.

8. The imaging device according to claim 1, wherein the controller changes the set shutter speed to a value of an integer multiple or 1/integer in the second live view display mode.

9. The imaging device according to claim 1, wherein the controller changes the first live view display mode to the second live view display mode when a state not operated in the first live view display mode passes a predetermined time.

10. An imaging device, comprising:
an imaging unit configured to sequentially output a digital image by capturing a subject;
a controller configured to:
change a shutter speed series, which is a series of a value of a shutter speed set for the imaging unit, to any of a first shutter speed series and a second shutter speed series, the second shutter speed series having a value of a shutter speed having a finer step than the first shutter speed series,
control an exposure time of the imaging unit according to the first shutter speed series or the second shutter speed series, and
change a live view display mode to either a first live view display mode or a second live view display mode, the first live view display mode being a mode sequentially displaying the digital image output according to a still image imaging sequence reading all pixels of an image captured with a value of a shutter speed of the second shutter speed series or a movie imaging sequence, and the second live view display mode being a mode sequentially displaying the digital image output according to an imaging sequence performing addition or thinning-out reading of pixels of the captured image in a case of the still image photographing mode or a mode sequentially displaying the movie captured at the value of the shutter speed of the second shutter speed series in a case of the movie photographing mode; and a display configured to display the digital image or the movie in the changed live view display mode and to simultaneously display a plurality of shutter speeds, wherein the controller changes a shutter speed to one shutter speed from the shutter speeds simultaneously displayed on the display, and the first live view display mode has at least an enlarged live view display mode and a normal magnification live view mode, the enlarged live view display mode is a mode in which a part of the digital image is cut out to be displayed at an enlargement magnification substantially equal to or more than a pixel equal magnification, and the normal live view display mode is a mode in which a display is performed at a lower magnification than the enlargement magnification.

11. An imaging device, comprising:

an imaging unit configured to sequentially output a movie by capturing a subject;

a display configured to display the movie; and a controller configured to:

change a shutter speed series, which is a series of a value of a shutter speed set for the imaging unit, to any of a first shutter speed series and a second shutter speed series, the second shutter speed series having a value of a shutter speed having a finer step than the first shutter speed series, control an exposure time of the imaging unit according to the first shutter speed series or the second shutter speed series, change a live view display mode to a first live view display mode or a second live view display mode, the first live view display mode being a mode which sequentially displays the movie output according to a movie imaging sequence reading all pixels of an image captured with a value of a shutter speed of the second shutter speed series and the second live view display mode being a mode which is captured in the movie imaging sequence and sequentially displays a movie subjected to image process set in a movie picture mode, set an output mode of a live view to any of a monitor mode and a recording mode, and output the same movie as the displayed movie to the outside according to the changed live view display mode when the monitor mode is set, output the movie displayed according to the first live view display mode or the movie displayed according to the second live view display mode to the display when the recording mode is set, and output the movie displayed according to the second live view display mode of an equal-magnification display without information display to the outside.

* * * * *